United States Patent
Ollila

(10) Patent No.: US 12,501,181 B2
(45) Date of Patent: Dec. 16, 2025

(54) COMPLEMENTING SUBSAMPLING IN STEREO CAMERAS

(71) Applicant: Varjo Technologies Oy, Helsinki (FI)

(72) Inventor: Mikko Ollila, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 184 days.

(21) Appl. No.: 18/357,553

(22) Filed: Jul. 24, 2023

(65) Prior Publication Data

US 2025/0039566 A1    Jan. 30, 2025

(51) Int. Cl.
| | |
|---|---|
| H04N 25/445 | (2023.01) |
| G06F 3/01 | (2006.01) |
| H04N 13/239 | (2018.01) |
| H04N 13/296 | (2018.01) |
| H04N 17/00 | (2006.01) |
| H04N 23/698 | (2023.01) |
| H04N 23/84 | (2023.01) |

(52) U.S. Cl.
CPC ......... *H04N 25/445* (2023.01); *G06F 3/013* (2013.01); *H04N 13/239* (2018.05); *H04N 13/296* (2018.05); *H04N 17/002* (2013.01); *H04N 23/698* (2023.01); *H04N 23/843* (2023.01)

(58) Field of Classification Search
None
See application file for complete search history.

(56) References Cited

U.S. PATENT DOCUMENTS

| | | | | |
|---|---|---|---|---|
| 12,124,623 | B1* | 10/2024 | Berkovich | G06F 3/013 |
| 2010/0188482 | A1* | 7/2010 | Routhier | H04N 13/339 |
| | | | | 348/E13.001 |
| 2011/0164112 | A1* | 7/2011 | Husak | H04N 19/61 |
| | | | | 348/E13.001 |
| 2012/0230580 | A1* | 9/2012 | Knee | G06T 7/97 |
| | | | | 382/154 |
| 2013/0070109 | A1* | 3/2013 | Gove | H04N 25/40 |
| | | | | 348/207.1 |

(Continued)

OTHER PUBLICATIONS

Y. Zhang, X. Ji, H. Wang and Q. Dai, "Stereo Interleaving Video Coding With Content Adaptive Image Subsampling," in IEEE Transactions on Circuits and Systems for Video Technology, vol. 23, No. 7, pp. 1097-1108, Jul. 2013 (Year: 2013).*

(Continued)

*Primary Examiner* — Stefan Gadomski
(74) *Attorney, Agent, or Firm* — ZIEGLER IP LAW GROUP, LLC.

(57) ABSTRACT

First image data including first subsampled image data of at least a first part of a first field of view a first image sensor is obtained. Second image data including second subsampled image data of at least a second part of a second field of view of a second image sensor is obtained. The first part and the second part have at least a part of an overlapping field of view. The first image data and the second image data are processed to generate a first image and a second image, respectively. During processing, interpolation and demosaicking on the first subsampled image data is performed by utilising the second subsampled image data, while interpolation and demosaicking on the second subsampled image data is performed by utilising the first subsampled image data.

18 Claims, 10 Drawing Sheets

(56) References Cited

U.S. PATENT DOCUMENTS

| | | | |
|---|---|---|---|
| 2013/0113884 A1* | 5/2013 | Leontaris | H04N 19/48 |
| | | | 348/43 |
| 2018/0197275 A1* | 7/2018 | Price | H04N 23/11 |
| 2019/0012795 A1* | 1/2019 | Dai | G06T 7/292 |
| 2019/0043167 A1* | 2/2019 | Steyskal | G02B 27/0172 |
| 2019/0142253 A1* | 5/2019 | Takahashi | G06T 7/20 |
| | | | 600/109 |
| 2019/0304120 A1* | 10/2019 | Ma | G06V 20/58 |
| 2019/0320105 A1* | 10/2019 | Tang | H04N 23/56 |
| 2019/0331919 A1* | 10/2019 | Huo | H04N 23/55 |
| 2020/0074589 A1* | 3/2020 | Stent | G06F 3/013 |
| 2020/0098139 A1* | 3/2020 | Kaplanyan | G06N 3/048 |
| 2020/0195862 A1* | 6/2020 | Briggs | G06T 7/593 |
| 2020/0275076 A1* | 8/2020 | Hamilton | H04N 19/33 |
| 2020/0412983 A1* | 12/2020 | Nakata | H04N 7/18 |
| 2021/0088790 A1* | 3/2021 | Forster | G02B 27/0176 |
| 2021/0125583 A1* | 4/2021 | Kaplanyan | G06N 3/088 |
| 2021/0358155 A1* | 11/2021 | Price | G06T 7/593 |
| 2021/0358156 A1* | 11/2021 | Price | G06V 10/7715 |
| 2021/0405518 A1* | 12/2021 | Lablans | H04N 13/243 |
| 2022/0182595 A1* | 6/2022 | Han | G06T 7/292 |
| 2022/0366568 A1* | 11/2022 | Arar | G06N 3/045 |
| 2023/0053497 A1* | 2/2023 | Sarwar | G06T 7/246 |
| 2023/0095462 A1* | 3/2023 | Ollila | G06F 3/014 |
| | | | 348/308 |
| 2023/0140768 A1* | 5/2023 | Nakata | H04N 23/82 |
| | | | 348/220.1 |
| 2024/0073564 A1* | 2/2024 | Cho | G06T 3/4053 |
| 2024/0179382 A1* | 5/2024 | Nayak | H04N 23/11 |
| 2024/0185380 A1* | 6/2024 | Wu | G09G 5/391 |
| 2024/0249478 A1* | 7/2024 | Sztuk | G06T 19/006 |
| 2024/0268682 A1* | 8/2024 | Mulliken | A61B 5/6803 |
| 2024/0277260 A1* | 8/2024 | Soldner | A61B 5/0077 |
| 2024/0338073 A1* | 10/2024 | Brailovskiy | G06F 3/013 |
| 2025/0013141 A1* | 1/2025 | Lablans | H04M 1/72409 |

OTHER PUBLICATIONS

Its'hak Dinstein, M. G. Kim, Avishai Henik, Joseph Tselgov, "Compression of stereo images using subsampling and transform coding," Opt. Eng. 30(9) (Sep. 1, 1991).*

* cited by examiner

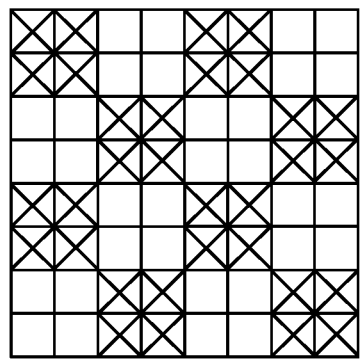
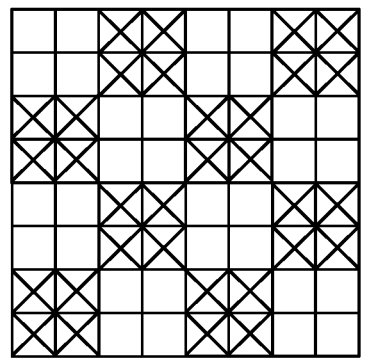
FIG. 4D FIG. 4E
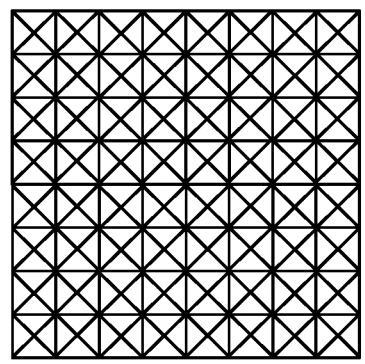
FIG. 4F

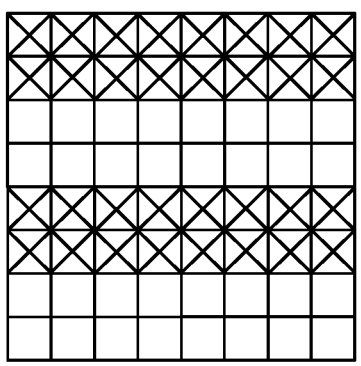
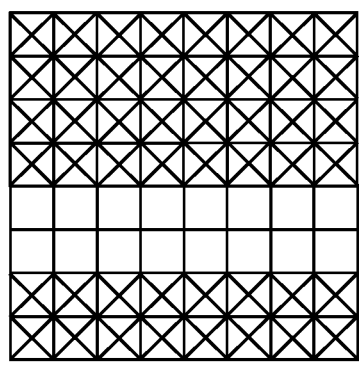
FIG. 5A        FIG. 5B
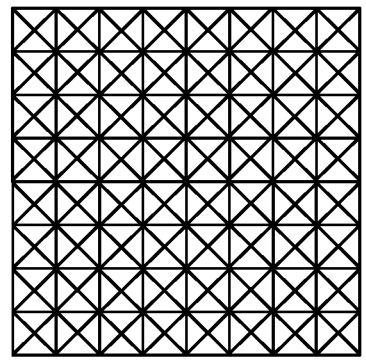
FIG. 5C

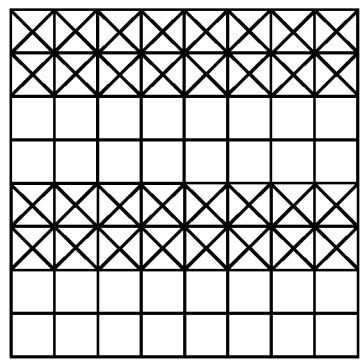
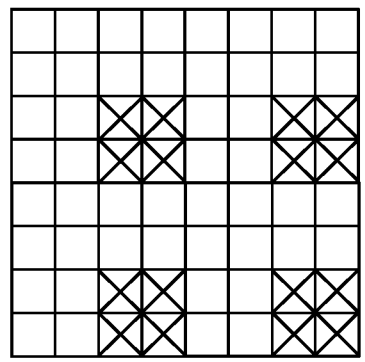
FIG. 7D    FIG. 7E
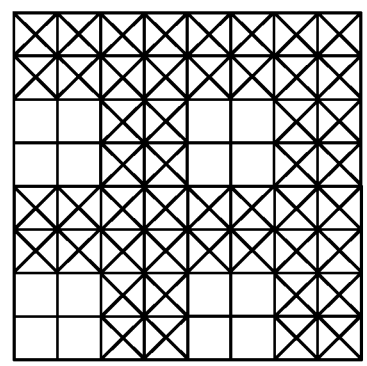
FIG. 7F

COMPLEMENTING SUBSAMPLING IN STEREO CAMERAS

TECHNICAL FIELD

The present disclosure relates to imaging systems incorporating complementing subsampling in stereo cameras. Moreover, the present disclosure relates to methods incorporating complementing subsampling in stereo cameras.

BACKGROUND

Nowadays, with an increase in the number of images being captured every day, there is an increased demand for developments in image capturing and processing. Such a demand is quite high and critical in case of evolving technologies such as immersive extended-reality (XR) technologies which are being employed in various fields such as entertainment, real estate, training, medical imaging operations, simulators, navigation, and the like. Several advancements are being made to develop image capturing and processing technology.

However, existing image capturing and processing technology has several limitations associated therewith. The existing image capturing and processing technology is inefficient in terms of generating images that have an acceptably high visual quality (for example, in terms of high resolution) throughout a wide field of view. This is because processing of image signals captured by pixels of an image sensor requires considerable processing resources, involves a long processing time, requires high computing power, and limits a total number of pixels that can be arranged on an image sensor for full pixel readout at a given frame rate. As an example, image signals corresponding to only about 10 million pixels on the image sensor may be processed currently (by full pixel readout) to generate image frames at 90 frames per second (FPS). This is far less than about 50 million pixels required to be read at 90 FPS for achieving a wide angle view of 130 degrees×105 degrees at a resolution of 60 pixels per degree (namely, to achieve human eye resolution). Moreover, the existing image capturing and processing technology is not well-suited for generating such high visual quality images along with fulfilling other requirements in XR devices, for example, such as small pixel size and high frame-rate requirements, image sensor output interface and Analog-to-Digital Converter (ADC) requirements, and Image Processing System (IPS) data throughput. Resultantly, generated images lack requisite visual quality, thereby leading to a poor, non-immersive viewing experience for a user.

Therefore, in light of the foregoing discussion, there exists a need to overcome the aforementioned drawbacks.

SUMMARY

The aim of the present disclosure is to provide an imaging system and a method to generate high-quality images for a wide field of view at a high framerate. The aim of the present disclosure is achieved by an imaging system and a method incorporating complementing subsampling in stereo cameras as defined in the appended independent claims to which reference is made to. Advantageous features are set out in the appended dependent claims.

Throughout the description and claims of this specification, the words "comprise", "include", "have", and "contain" and variations of the words, for example "comprising" and "comprises", mean "including but not limited to", and do not exclude other components, integers or steps. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 4A and 4D illustrate examples of a first subsampling pattern, FIGS. 4B and 4E illustrate respective examples of a second subsampling pattern, while FIGS. 4C and 4F illustrate respective examples of an overall subsampling pattern obtained by combining the first subsampling pattern and the second subsampling pattern, in accordance with an embodiment of the present disclosure;

FIG. 5A illustrates a first subsampling pattern, FIG. 5B illustrates a second subsampling pattern, while FIG. 5C illustrates an overall subsampling pattern obtained by combining the first subsampling pattern and the second subsampling pattern, in accordance with another embodiment of the present disclosure;

FIG. 6B illustrates a second subsampling pattern, while

FIGS. 7A and 7D illustrate examples of a first subsampling pattern, FIGS. 7B and 7E illustrate respective examples of a second subsampling pattern, while FIGS. 7C and 7F illustrate respective examples of an overall subsampling pattern obtained by combining the first subsampling pattern and the second subsampling pattern, in accordance with still another embodiment of the present disclosure;

FIGS. 8A and 8B illustrate exemplary ways in which a given subsampling mask indicates colours of pixels using spatial pixel codes, in accordance with an embodiment of the present disclosure;

FIG. 9A illustrates an exemplary colour filter array (CFA) pattern of a given image sensor indicated by a given subsampling mask, while FIG. 9B illustrates an exemplary way in which a portion of the given subsampling mask indicates colours in a smallest repeating 4×4 array in the given image sensor using different spatial pixel codes, in accordance with an embodiment of the present disclosure.

DETAILED DESCRIPTION OF EMBODIMENTS

Figure 1:
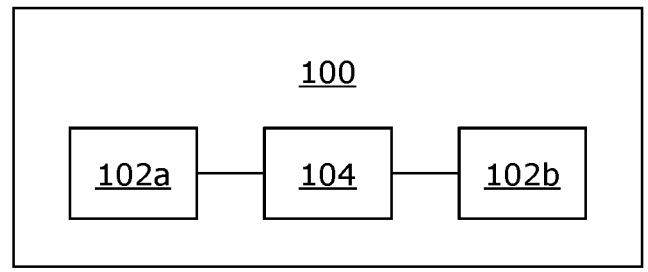
FIG. 1 illustrates a block diagram of an architecture of an imaging system incorporating complementing subsampling in stereo cameras, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an imaging system comprising:
- a first image sensor and a second image sensor, forming a stereo pair; and
- at least one processor configured to:
  - obtain first image data and second image data collected by the first image sensor and the second image sensor, respectively, wherein:
    - the first image data comprises first subsampled image data of at least a first part of a first field of view of the first image sensor, the first subsampled image data being subsampled according to a first subsampling pattern,
    - the second image data comprises second subsampled image data of at least a second part of a second field of view of the second image sensor, the second subsampled image data being subsampled according to a second subsampling pattern that is different from the first subsampling pattern,
    - the first part of the first field of view and the second part of the second field of view comprise at least a part of an overlapping field of view between the first image sensor and the second image sensor; and
  - process the first image data and the second image data to generate a first image and a second image, respectively, wherein, when processing, the at least one processor is configured to:
    - perform interpolation and demosaicking on the first subsampled image data, by utilising the second subsampled image data, to generate first intermediate image data;
    - perform interpolation and demosaicking on the second subsampled image data, by utilising the first subsampled image data, to generate second intermediate image data; and
    - process the first intermediate image data to generate the first image, and process the second intermediate image data to generate the second image.

In a second aspect, the present disclosure provides a method comprising:
- obtaining first image data and second image data collected by a first image sensor and a second image sensor, respectively, wherein the first image sensor and the second image sensor form a stereo pair, and wherein:
  - the first image data comprises first subsampled image data of at least a first part of a first field of view of the first image sensor, the first subsampled image data being subsampled according to a first subsampling pattern,
  - the second image data comprises second subsampled image data of at least a second part of a second field of view of the second image sensor, the second subsampled image data being subsampled according to a second subsampling pattern that is different from the first subsampling pattern,
  - the first part of the first field of view and the second part of the second field of view comprise at least a part of an overlapping field of view between the first image sensor and the second image sensor; and
- processing the first image data and the second image data to generate a first image and a second image, respectively, wherein the step of processing comprises:
  - performing interpolation and demosaicking on the first subsampled image data, by utilising the second subsampled image data, to generate first intermediate image data;
  - performing interpolation and demosaicking on the second subsampled image data, by utilising the first subsampled image data, to generate second intermediate image data; and
  - processing the first intermediate image data to generate the first image, and processing the second intermediate image data to generate the second image.

The first image and the second image (forming a stereo pair) are generated in a manner that a combined view of the first image and the second image has an acceptably high visual quality (for example in terms of high resolution) throughout a wide field of view. This is because the first subsampling image data and the second subsampling image data are subsampled according to two different (and preferably complementing) subsampling patterns (namely, the first subsampling pattern and the second subsampling pattern) for the part of the overlapping field of view between the first image sensor and the second image sensor, and then are processed by performing the interpolation and the demosaicking, in a highly accurate, yet efficient manner as compared to conventional techniques. Processing subsampled image data of the first image sensor by utilising the subsampled image data of the second image sensor (and vice versa) yields high quality images, whilst reducing computational burden, delays, and excessive power consumption. Moreover, a selective read out of image data also facilitates in providing a high frame rate of image frames. The imaging system and the method are simple, robust, support real-time and reliable complementing subsampling of stereo cameras, and can be implemented with ease.

Throughout the present disclosure, the term "image sensor" refers to a device that detects light from a real-world environment at its photo-sensitive surface, thereby enabling a plurality of pixels arranged on the photo-sensitive surface to capture a plurality of image signals. The plurality of image signals are electrical signals pertaining to a real-world scene of the real-world environment. The plurality of image signals constitute image data of the plurality of pixels.

Examples of a given image sensor include, but are not limited to, a charge-coupled device (CCD) image sensor, and a complementary metal-oxide-semiconductor (CMOS) image sensor. It will be appreciated that the plurality of pixels could, for example, be arranged in a rectangular two-dimensional (2D) grid, a polygonal arrangement, a circular arrangement, an elliptical arrangement, a freeform arrangement, or the like, on the photo-sensitive surface. In an example, the given image sensor may comprise 25 megapixels arranged in the rectangular 2D grid (such as a 5000×5000 pixel grid) on the photo-sensitive surface. The term "given image sensor" encompasses the first image sensor and/or the second image sensor.

It will be appreciated that the overlapping field of view between the first image sensor and the second image sensor represents a region in the real-world environment that lies in both the first field of view and the second field of view. This means that objects or their portions present in said region would be visible from the first field of view and the second field of view, and thus image signals pertaining to such objects or their portion would be captured by at least some pixels corresponding to the first part of the first field of view as well as by at least some pixels corresponding to the second part of the second field of view. It will be appreciated that the phrase "at least a part of an overlapping field of view" means that it is not necessary that an entirety of the overlapping field of view is subsampled in the first image data and the second image data. Thus, it may be possible that: (i) the part of the overlapping field of view could pertain to a gaze region of the given field of view only, or (ii) the part of the overlapping field of view could pertain to a peripheral region of the given field of view only. Each of the aforesaid cases (i) and (ii) are discussed later in detail.

Optionally, the first image sensor and the second image sensor are parts of a first camera and a second camera, respectively, wherein the first camera and the second camera are employed to capture the first image and the second image, respectively. The first image and the second image together represent a same real-world scene of the real-world environment, but are slightly offset with respect to each other, owing to slightly different fields of view being captured in the first image and the second image. The overlapping field of view of the first image sensor and the second image sensor corresponds to a portion of the real-world scene that is captured both by the first camera and the second camera. It will be appreciated that the first image is captured from a perspective of one of a left eye and a right eye of a user, whereas the second image is captured from a perspective of another of the left eye and the right eye. In this regard, the first camera and the second camera may be arranged to face the real-world environment in a manner that a distance between the first camera and the second camera is equal to an interpupillary distance (IPD) between the left eye and the right eye. In an example, the distance between the first camera and the second camera may be equal to an average IPD.

It will be appreciated that a given camera could, for example, be arranged anywhere in the real-world environment where a user is present, or could be arranged on a teleport device present in the real-world environment, or could be arranged on a client device worn by the user on his/her head. The term "teleport device" refers to a specialized equipment that is capable of facilitating virtual teleportation. The term "client device" refers to a specialized equipment that is capable of at least displaying a given image. Optionally, the at least one processor of the imaging system is communicably coupled with a processor of the client device. Optionally, the client device is implemented as a head-mounted display (HMD) device. The term "head-mounted display" device refers to a specialized equipment that is configured to present an extended-reality (XR) environment to the user when said HMD, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like. The term "given camera" encompasses the first camera and/or the second camera.

Optionally, the given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the given camera is implemented as a depth camera. Examples of the depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. The given camera is optionally implemented as a combination of the visible-light camera and the depth camera.

Optionally, a given image sensor comprises a Bayer colour filter array (CFA) arranged in front of a plurality of pixels of its photosensitive surface. Such a Bayer CFA could be one of: a 4C Bayer CFA (also referred to as "quad" or "tetra", wherein a group of 2×2 pixels has a same colour), a 9C Bayer CFA (also referred to as "nona", wherein a group of 3×3 pixels has a same colour), a 16C Bayer CFA (also referred to as "hexadeca", wherein a group of 4×4 pixels has a same colour). As an example, a given camera may have an image sensor having 576 million pixels, wherein 2×2 grids, 3×3 grids or even 4×4 grids of pixels of a same colour can be binned to form a single super pixel.

As another example, the RGB-IR camera can be a 2×2 pattern-based RGB-IR camera, a 4×4 pattern-based RGB-IR camera, or similar. Alternatively or additionally, optionally, the given image sensor comprises a multispectral filter arranged in front of the plurality of pixels. Herein, the term "multispectral filter" refers to a type of filter that is capable of selectively transmitting or blocking certain wavelengths of the light incident upon the given image sensor, thereby allowing only specific wavelengths of the light to pass therethrough. The multispectral filter is capable of filtering the light in a wider range of colours (for example, in 16 different colours or even more), as compared to traditional 3-5 colour filters used in any of the aforementioned visible-light cameras. The multispectral filters are well-known in the art.

Notably, the at least one processor controls an overall operation of the imaging system. The at least one processor is communicably coupled to the given image sensor. Optionally, the at least one processor is implemented as an image signal processor. In an example, the image signal processor may be a programmable digital signal processor (DSP). Alternatively, optionally, the at least one processor is implemented as a cloud server (namely, a remote server) that provides a cloud computing service.

Throughout the present disclosure, the term "image data" refers to information pertaining to a given pixel arranged on the photo-sensitive surface of the given image sensor, wherein said information comprises one or more of: a colour value of the given pixel, a depth value of the given pixel, a transparency value of the given pixel, a luminance value of the given pixel. In some implementations, the image data is RAW image data that has been read out from the given image sensor. The term "RAW image data" refers to image data that is unprocessed (or may be minimally processed) when obtained from the given image sensor. The RAW form of image data is well-known in the art. In other implementations, the image data is partially-processed image data that is generated upon performing certain image signal processing (ISP) on RAW image data, for example, in an ISP pipeline.

Notably, when given subsampled image data is collected by the given image sensor, it means that the given image sensor reads out only some pixels from at least a given portion of the photo-sensitive surface (that corresponds to at least a given part of a given field of view of the given image sensor) according to a given subsampling pattern, instead of reading out each and every pixel from at least the given portion of the photo-sensitive surface. Thus, when selectively reading out the given subsampled image data, image signals captured by only some pixels of the given portion of the photo-sensitive surface are processed. Optionally, when the plurality of pixels are arranged in the rectangular 2D grid on the photo-sensitive surface, the given image sensor is configured to read out the image data in a line-by-line manner.

It will be appreciated that such a selective read out of the given subsampled image data facilitates in providing a high frame rate of image frames. The frame rate is expressed in terms of frames per second (FPS), and may, for example, be 60 FPS, 90 FPS, 120 FPS, or higher. This is because a processing time for selectively reading out the given subsampled image data and generating image data of remaining unread pixels of said portion of the photo-sensitive surface, is considerably lesser as compared to a processing time for reading out RAW image data from each and every pixel of said portion of the photo-sensitive surface. Therefore, in a given time duration, a higher number of image frames could be generated and displayed when said portion of the RAW image data is selectively read out, as compared to when RAW image data from all pixels in said portion of the photo-sensitive surface is to be read out. It will also be appreciated that subsampling of given image data could either be performed during reading out from the given image sensor, or be performed prior to conversion of RAW image data into a given colour space format (for example, such as RGB format, Luminance and two-colour differences (YUV) format, or the like) in the ISP pipeline. Both of the aforesaid ways of subsampling are well-known in the art.

Throughout the present disclosure, the term "subsampling pattern" refers to a software-based masking pattern that enables in selectively reading out pixels from a given image sensor. In this regard, pixels whose locations are indicated in a given subsampling pattern as skipped are not read out from the given image sensor (and thus image data for such pixels is not obtained), while pixels whose locations are indicated in the given subsampling pattern as not skipped are read out from the given image sensor (and thus image data for such pixels is obtained). The given subsampling pattern may be utilised to provide a predetermined selection criterion for subsampling image data during the read out from the given image sensor. Optionally, the given subsampling pattern is a bit mask, wherein 'O' indicates a pixel to be skipped and '1' indicates a pixel to be read out.

It will be appreciated that the given subsampling pattern could be a non-regular pattern, wherein the non-regular pattern is a software-based masking pattern which indicates locations of irregularly-arranged (i.e., disorderly arranged) pixels in the given image sensor that are to be read out. Such pixels are not selected according to any typical or standardised spatially-regular manner, but in fact are deliberately and carefully selected in a spatially-irregular manner so as to facilitate in accurately and reliably generating image data corresponding to remaining pixels in the given image sensor. It will also be appreciated that the given subsampling pattern could alternatively be a random pattern, a gradient-type pattern, or a regular pattern.

Notably, when the second subsampling pattern is different from the first subsampling pattern, some pixels that are read out according to the second subsampling pattern may not be read out according to the first subsampling pattern, while some other pixels that are not read out (i.e., skipped) according to the second subsampling pattern may be read out according to the first subsampling pattern. Additionally, there may also be some pixels that are either skipped or read out by both the first subsampling pattern and the second subsampling pattern. Therefore, locations of all such pixels could be indicated in the first subsampling pattern and the second subsampling pattern accordingly.

Optionally, the second subsampling pattern is fully or partially complementary to the first subsampling pattern. In this regard, in some implementations, when the second subsampling pattern is fully complementary to the first subsampling pattern, it means that the second subsampling pattern and the first subsampling pattern do not overlap with each other at all (i.e., no common pixels are read out according to both the second subsampling pattern and the first subsampling pattern), yet, when the second subsampling pattern and the first subsampling pattern are combined together, they cover an entirety of the part of the overlapping field of view. In other words, pixels that are to be read out according to the second subsampling pattern are entirely different from pixels that are to be read out according to the first subsampling pattern such that pixels that are not read out according to the second subsampling pattern, are read out according to the first subsampling pattern, and vice versa. Resultantly, full image data is read out for the entirety of the part of the overlapping field of view from both the first image sensor and the second image sensor in a combined manner. For sake of better understanding, this implementation has been illustrated in conjunction with FIGS. 4A, 4B, and 4C, and FIGS. 4D, 4E, and 4F.

In other implementations, when the second subsampling pattern is partially complementary to the first subsampling pattern, it could mean that:
(i) the second subsampling pattern and the first subsampling pattern partially overlap with each other (i.e., some common pixels are to be read out according to both the second subsampling pattern and the first subsampling pattern, in addition to pixels that are to be read out according to the second subsampling pattern and the first subsampling pattern individually), and when the second subsampling pattern and the first subsampling pattern are combined, they cover the entirety of the part of the overlapping field of view, or
(ii) the second subsampling pattern and the first subsampling pattern partially overlap with each other, and when the second subsampling pattern and the first subsampling pattern are combined, they do not cover the entirety of the part of the overlapping field of view (i.e., some image data is not read out for the part of the overlapping field of view from any of the first image sensor and the second image sensor), or
(iii) the second subsampling pattern and the first subsampling pattern do not overlap with each other at all, and when the second subsampling pattern and the first subsampling pattern are combined, they do not cover the entirety of the part of the overlapping field of view (i.e., some image data is not read out for the part of the overlapping field of view from any of the first image sensor and the second image sensor).

Figure 6A:
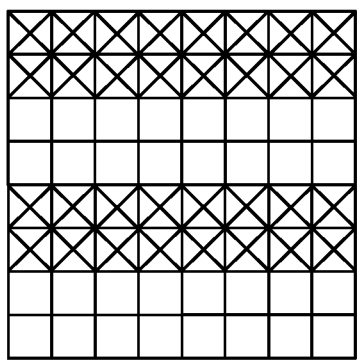
FIG. 6A illustrates a first subsampling pattern.
Figure 6B:
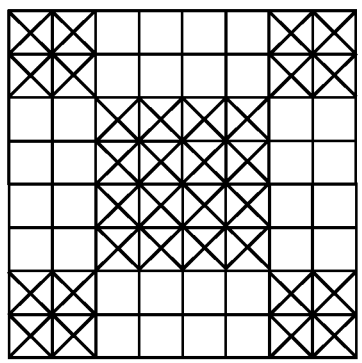
Figure 6C:
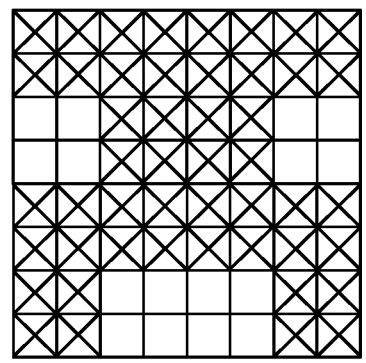
FIG. 6C illustrates an overall subsampling pattern obtained by combining the first subsampling pattern and the second subsampling pattern, in accordance with yet another embodiment of the present disclosure.

For sake of better understanding, case (i) has been illustrated in conjunction with FIGS. 5A, 5B, and 5C, case (ii) has been illustrated in conjunction with FIGS. 6A, 6B, and 6C, and case (iii) has been illustrated in conjunction with FIGS. 7A, 7B, and 7C, and FIGS. 7D, 7E, and 7F.

Notably, the interpolation is performed on image data of the read pixels in the first subsampled image data to generate image data of remaining unread/missed pixels in the first subsampled image data. In this regard, image data of at least some remaining unread pixels in the first subsampled image data is easily obtained by using the second subsampled image data, depending on an extent to which the second subsampling pattern complements the first subsampling pattern. Similarly, the interpolation is performed on image data of the read pixels in the second subsampled image data to generate image data of remaining unread/missed pixels in the second subsampled image data.

In this regard, image data of at least some remaining unread pixels in the second subsampled image data is easily obtained by using the first subsampled image data, depending on an extent to which the first subsampling pattern complements the second subsampling pattern. Moreover, the "interpolation" is a specialized process of reconstructing image data of some pixels in the given subsampled image data by using image data read out from other neighbouring pixels in the given subsampled image data. The interpolation is required because the first image data and the second image data are subsampled. The interpolation is well-known in the art.

Optionally, the interpolation is performed by employing at least one interpolation filtering algorithm. Optionally, the at least one interpolation filtering algorithm is at least one of: a bilinear interpolation algorithm, an edge-directed weighted-sum interpolation algorithm, a weighted sum interpolation algorithm, a local colour ratio (LCR) algorithm, a median-based interpolation algorithm, an average-based interpolation algorithm, a linear interpolation filtering algorithm, a cubic interpolation filtering algorithm, a four-nearest-neighbours interpolation filtering algorithm, a natural-neighbour interpolation filtering algorithm, a steering kernel regression interpolation filtering algorithm. The aforesaid algorithms are well-known in the art.

Upon performing the interpolation, the demosaicking is performed for generating the first intermediate image data comprising a set of complete colour values (for example, such as RGB colour values or similar) for each pixel in the first subsampled image data, and for generating the second intermediate image data comprising a set of complete colour values for each pixel in the second subsampled image data. Such sets of complete colour values are subsequently utilised for generating the first image and the second image. In some implementations, the interpolation is performed on the given subsampled image data prior to the demosaicking. In other implementations, the demosaicking and the interpolation are combined as a single operation, for example, when at least one neural network is to be employed (by the at least one processor) for performing the demosaicking and the interpolation (as discussed later). Some aforesaid interpolation filtering algorithms could also be used for performing the demosaicking.

Throughout the present disclosure, the term "image" refers to a visual representation of a real-world environment. The term "visual representation" encompasses colour information represented in a given image, and additionally optionally other attributes associated with the given image (for example, such as depth information, luminance information, transparency information (namely, alpha values), polarization information, and the like).

Optionally, when processing the first intermediate image data and the second intermediate image data to generate the first image and the second image, respectively, the at least one processor is configured to employ at least one image processing algorithm. Examples of the at least one image processing algorithm include, but are not limited to, an image denoising algorithm, an image sharpening algorithm, a colour conversion algorithm, an auto white balancing algorithm, a deblurring algorithm, a contrast enhancement algorithm, a low-light enhancement algorithm, a tone mapping algorithm, a super-resolution algorithm, and an image compression algorithm. Such image processing techniques are well-known in the art. An image quality of a stereo pair of the first image and the second image so generated emulates image viewing quality and characteristics of human visual system. Moreover, a combined view of the first image and the second image covers a wide field of view of the real-world environment, and has an acceptably high visual quality (for example in terms of high resolution) throughout.

Moreover, optionally, the at least one processor is configured to process the first image data and the second image data to generate the first image and the second image, respectively, using at least one neural network, wherein an input of the at least one neural network comprises the first image data and the second image data. In this regard, the at least one neural network is used for performing the interpolation and the demosaicking on the first subsampled image data, to generate the first intermediate image data, which is then processed to generate the first image. Simultaneously, the at least one neural network is used for performing the interpolation and the demosaicking on the second subsampled image data, to generate the second intermediate image data, which is then processed to generate the second image. The at least one neural network performs the interpolation and the demosaicking in a highly accurate manner, as compared to conventional techniques. It will be appreciated that the input (comprising the first image data and the second image data) is provided to the at least one neural network both in a training phase of the at least one neural network and in an inference phase of the at least one neural network (i.e., when the at least one neural is utilised after it has been trained). It will also be appreciated that when the at least one neural network is used, the demosaicking and the interpolation could be combined as a single operation, unlike in the conventional techniques where the demosaicking and the interpolation are treated as separate operations and where information pertaining to linear or non-linear relationships between neighbouring pixels is necessary for performing these operations. The interpolation performed using the at least one neural network can be understood to be inpainting or hallucinating missing image data. In addition to these operations, there could be various image enhancement or image restoration operations (as mentioned hereinbelow) that can be performed additionally and optionally, using the at least one neural network. In this way, the at least one neural network may be trained to generate acceptably accurate missing image data based on available image data. These operations can even be performed at different scales or levels of detail to enhance an overall visual quality of the given image.

Additionally, optionally, a training process of the at least one neural network involves utilising a loss function that is generated based on perceptual factors and contextual factors. Such a loss function would be different from a loss function utilised in the conventional techniques. Perceptual loss factors may relate to visual perception of the generated given image. Instead of solely considering pixel-level differences, perceptual loss factors aim to measure a similarity in terms of higher-level visual features of an image. Contextual loss factors may take into account a relationship and a coherence between neighbouring pixels in the image. By incorporating the perceptual factors and the contextual factors into the training process, the at least one neural network can produce a visually-pleasing and contextually-coherent result. It will be appreciated that the loss function of the at least one neural network could optionally also take into account various image enhancement/restoration operations beyond just the demosaicking and the interpolation; the various image enhancement/restoration operations may, for example, include at least one of: deblurring, contrast enhancement, low-light enhancement, tone mapping, colour conversion, super-resolution, white balancing, super-resolution, compression.

When evaluating a performance of the at least one neural network and its associated loss function, it can be beneficial to compare the generated image and a ground-truth image at different scales/resolutions. This can be done to assess an image quality and a visual fidelity of the generated image across various levels of detail/resolutions. For instance, the aforesaid comparison can be made at a highest resolution, which represents an original resolution of the image. This allows for a detailed evaluation of pixel-level accuracy of the generated image. Alternatively or additionally, the aforesaid comparison can be made at a reduced resolutions, for example, such as ¼th of the original resolution. This provides an assessment of an overall perceptual quality and ability of the at least one network to capture and reproduce important visual features at coarser levels of detail also. Thus, by evaluating the loss function at different scales, more comprehensive understanding of the performance of the at least one neural network can be known. The loss function, the perceptual factors, and the contextual factors are well-known in the art.

Optionally, the input of the at least one neural network further comprises at least one first subsampling mask and at least one second subsampling mask, wherein the at least one first subsampling mask indicates pixels that are missing in the first subsampled image data, and the at least one second subsampling mask indicates pixels that are missing in the second subsampled image data. Herein, the term "subsampling mask" refers to a software-based mask that indicates pixels that are missing (namely, unread) in given subsampled image data. In this regard, pixels whose locations are indicated in a given subsampling mask as skipped are not read out from the given image sensor. The term "given subsampling mask" encompasses the at least one first subsampling mask and/or the at least one second subsampling mask. Optionally, the given subsampling mask indicates the pixels that are missing in the given subsampled image data by way of a given subsampling pattern. The given subsampling pattern has already been described earlier in detail. It will be appreciated that the given subsampling mask could be a single mask or multiple masks (for example, such as one subsampling mask indicating a CFA pattern of the given image sensor, another subsampling mask indicating unread pixels and, optionally, read-out pixels in the given subsampled image data). It will also be appreciated that the at least one first subsampling mask and the at least one second subsampling mask provide the at least one neural network with necessary information on which pixels are missing in the first subsampled image data and which pixels are missing in the second subsampled image data, so as to facilitate in accurately and reliably generating image data corresponding to such missing pixels (by way of performing the interpolation as explained earlier).

Moreover, optionally, the given subsampling mask further indicates a CFA pattern of the given image sensor. The term "colour filter array" refers to an arrangement of colour filters in front of the plurality of pixels of the given image sensor in a manner that each pixel of the given image sensor is covered by a colour filter (for example, a red colour filter, a green colour filter, a blue colour filter, or similar) that allows only a certain wavelength of light (corresponding to a colour of the colour filter) to pass therethrough and be detected by the given image sensor. Examples of the CFA pattern include, but are not limited to, a Bayer CFA pattern, an X-Trans CFA pattern, a Tetracell CFA pattern, and a Nonacell CFA pattern. The aforesaid CFA patterns are well-known in the art.

It will be appreciated that the CFA pattern represents locations of different colour pixels (for example, green colour pixels, red colour pixels, and blue colour pixels that correspond to green colour filters, red colour filters, and blue colour filters of the CFA pattern, respectively) that can be read out from the given image sensor. The CFA pattern enables the at least one neural network to perform interpolation and demosaicking.

It will also be appreciated that the given subsampling mask may be implemented as a single subsampling mask indicating an entirety of the CFA pattern, or be implemented as different subsampling masks indicating different colour filters of the CFA pattern separately. Moreover, information pertaining to the CFA pattern may be coded into a mosaic guidance matrix, wherein the different colour filters of the CFA pattern are represented using different indexing values in the mosaic guidance matrix. In an example, for a 2×2 array of RGGB pixels, indexing values 0, 1, and 2 may be used to represent a red colour filter, a green colour filter, and a blue colour filter, respectively, of the CFA pattern. One such way of indicating the CFA pattern is described, for example, in "*Demo-Net: A Low Complexity Convolutional Neural Network for Demosaicking Images*" by Mert Bektas et al., published in IEEE International Conference on Consumer Electronics, pp. 1-2, 2022, which has been incorporated herein by reference.

Moreover, optionally, the given subsampling mask further indicates at least one of:
 colours of pixels that have been read out,
 colours of pixels that have not been read out,
 different colours using different spatial pixel codes,
 repetitions of a same colour in a smallest repeating M×N array in the given image sensor using different spatial pixel codes,
 different combinations of neighbouring pixels having a same colour in the smallest repeating M×N array using different spatial pixel codes,
 pixels per degree of the given image data.

In this regard, by indicating the colours of pixels that have been read out and/or the colours of pixels that have not been read out in the given subsampling mask, the at least one neural network would accurately know for which pixels image data is available, and for which pixels image data is unread. Then, unread image data can be easily and accurately generated by the at least one neural network using available image data. Furthermore, using the different spatial pixel codes for indicating the colours of pixels that have been read out and that have not been read out is relatively easier and convenient to implement. Advantageously, this may also facilitate in training the at least one neural network in a time-efficient manner, and potentially reducing processing time and utilization of processing resources of the at least one processor for generating given intermediate image data.

A given spatial pixel code represents a colour and optionally, a spatial position of a given pixel in a smallest repeating M×N array. Pixels having same colours may or may not have a same spatial pixel code. The given spatial pixel code could, for example, be a numeric code, an alphabetic code, an alphanumeric code, and the like. In an example, a portion of the given subsampling mask may correspond to a 4×4 array of pixels, and the portion may be repeated in an entirety of the given subsampling mask. The portion of the given subsampling mask may indicate 4 pixels (for example, such as two green colour pixels, one blue colour pixel, and one red colour pixel) that have been read out from amongst 16 pixels, and may also indicate colours of such 4 pixels, using different spatial pixel codes, for example, such as '0' indicating a green colour pixel, '1' indicating a blue colour pixel, and '2' indicating a red colour pixel. One such example has been also illustrated in conjunction with FIG. 8A, for sake of better understanding. Additionally, said portion of the given subsampling mask may also indicate 12 pixels that have not been read out (namely, 12 pixels that are skipped) from amongst the 16 pixels, using a single spatial pixel code, for example, such as '3', '4', '-1', or similar. Such a single spatial pixel code only indicates that these 12 pixels have not been read out.

Alternatively, in the previous example, the portion of the given subsampling mask may indicate colours of the 4 pixels, using different spatial pixel codes, for example, such as '0' indicating a first green colour pixel, '1' indicating a blue colour pixel, '2' indicating a red colour pixel, and '3' indicating a second green colour pixel. Additionally, said portion may also indicate colours of the 12 pixels that have not been read out, using different spatial pixel codes, for example, such as '4' indicating a first unread green colour pixel, '5' indicating an unread red colour pixel, '6' indicating an unread blue colour pixel, and '7' indicating a second unread green colour pixel. Such an example has been also illustrated in conjunction with FIG. 8B, for sake of better understanding.

Additionally, optionally, when the same colour is repeated in the smallest repeating M×N array, different spatial pixel codes could be used for indicating different neighbouring pixels having the same colour in the smallest repeating M×N array. The term "smallest repeating M×N array" refers to a smallest array of pixels that is repeated in the given image sensor. The M×N array could, for example, be a 2×2 array, a 3×3 array, a 4×4 array, or similar. In an example, a portion of the given subsampling mask may indicate colours in a smallest repeating 4×4 array in the given image sensor such that 4 blue colour pixels are indicated using 4 different spatial pixel codes '1', '2', '3', and '4', respectively, 8 green colour pixels are indicated using 8 different spatial pixel codes '5', '6', '7', '8', '9', '10', '11', and '12', respectively, and 4 red colour pixels are indicated using 4 different spatial pixel codes as '13', '14', '15' and '16', respectively. Such an example has been also illustrated in conjunction with FIG. 9B, for sake of better understanding.

Additionally, optionally, two or more neighbouring pixels having the same colour in the smallest repeating M×N array are combined together to be read out as a single pixel, and thus are indicated in the given subsampling mask using a different spatial pixel code. As a result, these different spatial pixel codes indicate how a combination of certain neighbouring pixels have been read out together. Such a combination could, for example, be a horizontal combination, a vertical combination, and/or a diagonal combination. It will be appreciated that the repetitions of the same colour or the two or more neighbouring pixels having the same colour could be combined together (for example, such as using a binning technique), and thus could be indicated in the given subsampling mask using a different spatial pixel code. Said combination may occur in an analog domain (wherein, analog electrical signals of the two or more neighbouring pixels are combined prior to their conversion to digital colour values), or in a charge domain (wherein, electrical charge signals of the two or more neighbouring pixels are combined before they are read out). Beneficially, this could potentially reduce an overall number of read-outs of similar colour pixels, and thereby saving processing resources and processing time of the at least one processor. The binning technique is well-known in the art.

It will also be appreciated in an actual implementation of the at least one neural network, different spatial pixel codes may be scaled and normalized in order to optimize a performance of the at least one neural network. As an example, the different spatial pixel codes may be scaled in a range of −1 to 1 or in a range of 0 to 1. This enables to prevent numerical instability during training of the at least one neural network. As another example, the different spatial pixel codes may be scaled and normalised in a range of 0 to 255. As yet another example, the different spatial pixel codes may be scaled and normalised using floating-point precision (such as float16, float32, float64, or the like) or using integer precision (such as int8, int16, or the like). Other normalization or scaling techniques could also be possible, for example, that are based on average colour values when there are different number of colour pixels.

Referring to and continuing with the above example, the 2 green colour pixels having the spatial pixel codes '9' and '10' or having spatial pixel codes '9' and '12' can be combined together and be indicated in the given subsampling mask by using a different spatial pixel code '17'. Similarly, the 3 red colour pixels having the spatial pixel codes '13', '14', and '16' can be combined together and be indicated in the given subsampling mask by using a different spatial pixel code '18'. All the four red colour pixels having the spatial pixel codes '13', '14', '15', and '16' can be combined (i.e., binned/averaged) together and be indicated in the given subsampling mask by using a different spatial pixel code '19' for all the four red colour pixels.

Optionally, the input of the at least one neural network further comprises information indicative of a resolution (for example, such as in terms of pixels per degree) of the first image data and the second image data. However, when it is already known to the at least one neural network that the given image sensor reads out image data at a particular resolution, the information indicative of the resolution may not be required to be provided as the input each time.

Additionally, optionally, the pixels per degree (PPD) of the given image data could vary spatially, depending on a distortion profile of the given camera. In such a case, pixel density would also vary across a field of view of the camera. As the PPD could be a function of a pixel location, the PPD could also be indicated in the given subsampling mask by way of pixel locations. It will be appreciated that the PPD of the given image data as indicated in the given subsampling mask would facilitate the at least one neural network to conveniently and accurately process the given image data, for producing the given image. Resultantly, visual information represented in the given image (for example, colours, depths, brightness, and the like, of pixels in the full image frame) would be highly accurate and realistic. Furthermore, information pertaining to the PPD could be stacked/embedded with colour filter data. For example, when an RGGB Bayer CFA is employed, the information pertaining to the PPD may be stacked with each of four colour planes of RGGB Bayer CFA data. By stacking said information with the colour filter data, resulting output would have same spatial dimensions as colour planes of the colour filter array employed.

Furthermore, optionally, the at least one neural network is any one of: a U-net type neural network, an autoencoder, a pure Convolutional Neural Network (CNN), a Residual Neural Network (ResNet), a Vision Transformer (ViT), a neural network having self-attention layers, a generative adversarial network (GAN). It will be appreciated that a cascade of neural networks could also be employed for processing the first image data and the second image data to generate the first image and the second image, respectively. As an example, two neural networks in said cascade may be employed, wherein a first neural network is a U-net type neural network that is employed for performing the interpolation on the first image data and the second image data, and a second neural network is another U-net type neural network that is employed for performing the demosaicking.

It will be appreciated that conventional Bayer CFA pattern-based image sensors typically allow for skipping entire rows and/or entire columns of a Bayer CFA pattern, i.e., some pixels may not have colour information captured in those rows and/or columns, because the resulting subsampled data is still in accordance with the Bayer CFA pattern. As an example, entire rows and/or entire columns may be skipped in an alternating manner conventionally. However, such conventional image sensors do not typically support skipping rows and/or columns only partially. Pursuant to embodiments of the present disclosure, the at least one neural network could still handle such an uneven subsampling from the Bayer CFA pattern where rows and/or columns are skipped partially (for example, as shown in FIGS. 4D and 4E). This implies that the at least one neural network could potentially work with a subset of pixels from a given row and/or a given column of the Bayer CFA pattern.

Optionally, the at least one neural network has a first path and a second path that are employed to process the first image data and the second image data, respectively, the first path and the second path being parallel paths. In this regard, the at least one neural network employs two distinct parallel processing paths (namely, the first path and the second path) in which separate sequences of operations or layers of the at least one neural network are dedicatedly utilised to process the first image data and the second image data, respectively. The technical benefit of employing the first path and the second path in a parallel manner is that they can operate independently and simultaneously (rather than sequentially), thereby enabling considerably fast and concurrent processing of the first image data and the second image data. This could potentially facilitate in generating the first image and the second image (upon processing the first image data and the second image data) in real time or near-real time (with minimal latency/delay).

Optionally, the first path and the second path of the at least one neural network are configured to share at least one of:
(i) the first subsampled image data from the first path to the second path,
(ii) the second subsampled image data from the second path to the first path,
(iii) first interpolated image data, generated after performing the interpolation on the first subsampled image data, from the first path to the second path,
(iv) second interpolated image data, generated after performing the interpolation on the second subsampled image data, from the second path to the first path,
(v) the first intermediate image data from the first path to the second path,
(vi) the second intermediate image data from the second path to the first path.

In this regard, when processing the first image data and the second image data via the first path and the second path, respectively, the first path and the second path could share at least one of the aforesaid forms of image data with each other. The technical benefit of such sharing is that the first image data and the second image data could be accurately and conveniently processed in a computationally-efficient and time-efficient manner, in order to generate the first image and the second image in real time or near-real time. This is because since the part of the overlapping field of view is subsampled in both the first image data and the second image data, image data of unread pixels in the first part of the first field of view could be obtained from image data of read pixels in the second part of the second field of view, and vice versa. This is due to the fact that there may be some common pixels (belonging to the part of the overlapping field of view that is visible in both the first image and the second image) that are read out in the first image data but are not read out in the second image data, and some common pixels that are read out in the second image data but are not read out in the first image data. However, it is also possible that there could be some common pixels that are read out in both the first image data and the second image data. Therefore, sharing of image data of such common pixels between the first path and the second path would be beneficial in processing the first image data and the second image data more efficiently and accurately. Such a sharing may also be referred to as cross-view of features between the first path and the second path.

It will be appreciated that sharing at least one of the aforesaid forms of image data between the first path and the second path could be implemented by employing attention modules in the first path and the second path. The attention modules allow the at least one neural network to selectively share and fuse the aforesaid forms of image data between the first path and the second path. The attention modules in neural networks are well-known in the art.

Optionally, when the first subsampled image data is shared from the first path to the second path, some of unread image data in the second subsampled image data is obtained from the first subsampled image data. Additionally or alternatively, optionally, when the second subsampled image data is shared from the second path to the first path, some of unread image data in the first subsampled image data is obtained from the second subsampled image data.

Optionally, when the first interpolated image data is shared from the first path to the second path, some of the second interpolated image data that is to be generated after performing the interpolation on the second subsampled image data, is obtained from the first interpolated image data. Additionally or alternatively, optionally, when the second interpolated image data is shared from the second path to the first path, some of the first interpolated image data that is to be generated after performing the interpolation on the first subsampled image data, is obtained from the second interpolated image data.

Optionally, when the first intermediate image data is shared from the first path to the second path, some of the second intermediate image data that is to be generated after performing the interpolation and the demosaicking on the second subsampled image data, is obtained from the first intermediate image data. Additionally or alternatively, optionally, when the second intermediate image data is shared from the second path to the first path, some of the first intermediate image data that is to be generated after performing the interpolation and the demosaicking on the first subsampled image data, is obtained from the second intermediate image data.

It will be appreciated that in order to preserve structural details of neighbouring pixels (for example, such as information pertaining to edges, blobs, high-frequency features, and the like) in a given image (namely, the first image and/or the second image), and to avoid generation of undesirable artifacts in the given image, a gradient loss function (L) could be beneficially employed in a pixel-by-pixel manner. The gradient loss function (L) could, for example, be represented as follows:

$$L = \|\nabla Y - \nabla Y'\| + \|\nabla' Y - \nabla' Y'\|$$

wherein $\nabla$ and $\nabla'$ represent a horizontal gradient operation and a vertical gradient operation, respectively. The gradient loss function (L) measures a discrepancy between gradients of two versions of the same (given) image in both a horizontal direction and a vertical direction. Various gradient loss functions may be employed apart from that mentioned above. As an example, a gradient loss function may comprise masks that selectively exclude or include certain pixels, for example, such as only interpolated pixels would be considered in a calculation of the gradient loss function. By using masks to control inclusion or exclusion of the certain pixels, the gradient loss function can be employed to focus on specific regions or features of interest in the given image. This flexibility allows for more fine-grained control over preservation of the structural details in the given image. Additionally, a directional weighted interpolation technique may be used for performing an interpolation on image data of the given image.

Furthermore, in an embodiment, the at least one processor is configured to:
  obtain information indicative of a gaze direction of a first eye of a user;
  identify a gaze position within the first field of view, based on the gaze direction of the first eye; and
  vary a subsampling density in the first subsampling pattern, based on an angular distance from the gaze position, wherein the subsampling density decreases on going away from the gaze position.

Optionally, in this regard, the information indicative of the gaze direction of the first eye of the user is obtained from the given client device. In such a case, the given client device optionally comprises gaze-tracking means. The term "gaze direction" refers to a direction in which a given eye of the user is gazing. The gaze direction may be represented by a gaze vector. Furthermore, the term "gaze-tracking means" refers to specialized equipment for detecting and/or following gaze of the given eye of the user. The gaze-tracking means could be implemented as contact lenses with sensors, cameras monitoring a position of a pupil of the given eye of the user, and the like. Such gaze-tracking means are well-known in the art.

In an implementation, the gaze direction is a current gaze direction. In another implementation, the gaze direction is a predicted gaze direction. The predicted gaze direction could be predicted, for example, based on a change in user's gaze during a predefined time period, wherein the predicted gaze direction lies along a direction of the change in the user's gaze. The change in the user's gaze could be determined, for example, in terms of velocity and/or acceleration of the user's gaze, using information indicative of previous gaze directions of the given eye of the user and/or the current gaze direction. In yet another implementation, the gaze direction is a default gaze direction, wherein the default gaze direction is straight towards a centre of a given field of view of the given image sensor. In such an implementation, it is considered that the gaze of the given eye of the user is, by default, typically directed towards a centre of his/her field of view. It is to be understood that a gaze position corresponding to the default gaze direction lies at a centre of the given field of view of the given image sensor.

Optionally, when identifying the gaze position within the first field of view, the at least one processor is configured to map the gaze direction of the first eye onto the first field of view. The term "gaze position" refers to a position on the given field of view of the given image sensor onto which the gaze direction is mapped. The gaze position within the first field of view may, for example, be at a centre of the first field of view, at a point in a top-left region of the first field of view, at a point in a bottom-right region of the first field of view, or similar.

Further, the term "subsampling density" refers to a number of pixels that are to be read out (namely, sampled) from at least the given part of the given field of view per unit area. In this regard, said area may be expressed in terms of a total number of pixels, a number of pixels in both horizontal and vertical dimensions, units of length, or similar. For example, the subsampling density may be 2 pixels per 10 pixels, 4 pixels per 4×4 array of pixels, 5 pixels per 50 square micrometres of the image sensor, or similar. Greater the subsampling density, greater is the number of pixels that would be read out from at least the given part of the given field of view per unit area, and vice versa.

The subsampling density reduces across the first subsampling pattern as the angular distance from the gaze position increases, i.e., the subsampling density in the first subsampling pattern is higher for a part of the first field of view including and surrounding the gaze position as compared to a remaining part. Therefore, a number of pixels that are to be read out per unit area decreases on going from the part including and surrounding the gaze position towards the remaining part. In other words, the subsampling density is spatially dense in said part including and surrounding the gaze position, and is spatially sparse for the remaining part. This is because pixels corresponding to said part (i.e., pixels lying near the gaze position) would be perceived in the first image with high visual acuity by a fovea of the first eye of the user, as compared to pixels corresponding to the remaining part (i.e., pixels lying far from the gaze position). Thus, a higher subsampling density is required near the gaze position for accurately and reliably generating image data corresponding to unread pixels lying near the gaze position, using image data corresponding to the (read out) pixels lying near the gaze position, to produce a high and spatially-variable resolution in the first image. It may be possible that an entirety of the given image data (including a gaze region of the given field of view and a peripheral region of the given field of view) is subsampled, although at different subsampling densities.

It will be appreciated that when the subsampling density in the first subsampling pattern decreases on going away from the gaze position, a binning ratio (i.e., a number of pixels binned into a single pixel that is sampled) and a pixel-skipping ratio (i.e., a ratio of a number of skipped pixels and a number of pixels that are read out per unit area) in the first subsampling pattern increases on going away from the gaze position. In an example, the binning ratio near the gaze position may be 6:1, 4:1, 2:1, or similar, whereas the binning ratio considerably far from the gaze position may be 16:1, 12:1, 9:1, 8:1, or similar. The sampled pixel(s) and binned pixels could be arranged as a 2×1 grid, a 2×2 grid, a 3×2 grid, a 3×3 grid, a 4×3 grid, a 4×4 grid or similar. In an example implementation, the given subsampling pattern changes from one image to another image, and for each image, a subsampling density of its corresponding subsampling pattern decreases on going away from the gaze position.

In an embodiment, the at least one processor is configured to:
- obtain information indicative of a gaze direction of a first eye of a user;
- identify a gaze position within the first field of view, based on the gaze direction of the first eye;
- detect whether the gaze position lies within the overlapping field of view; and
- when it is detected that the gaze position lies within the overlapping field of view, select the part of the overlapping field of view based on the gaze position, wherein the part of the overlapping field of view includes and surrounds the gaze position.

Information pertaining to the gaze direction and identifying the gaze position based on the gaze direction have been already discussed earlier in detail. It will be appreciated that when the gaze position is identified to be within the first part of the first field of view (comprising the part of the overlapping field of view), it can be easily and accurately detected that the gaze position lies within the overlapping field of view. Further, when the part of the overlapping field of view includes and surrounds the gaze position, the part of the overlapping field of view could pertain to a gaze region of the first field of view (namely, the part of the first field of view) only. It will be appreciated that subsampling of image data in the part of the overlapping field of view even when said part includes and surrounds the gaze position is beneficial due to complementing nature of subsampling performed in the first image data and the second image data. In such a case, both the interpolation and the demosaicking are performed on the first subsampled image data accordingly (i.e., by utilising the second subsampled image data). This facilitates in generating gaze-contingent pixels of the first image, whilst reducing the frame rate.

In another embodiment, the at least one processor is configured to:
- obtain information indicative of a gaze direction of a first eye of a user;
- identify a gaze position within the first field of view, based on the gaze direction of the first eye; and
- select a remaining part of the first field of view, based on the gaze position, wherein the remaining part of the first field of view includes and surrounds the gaze position.

In this regard, when the remaining part of the first field of view includes and surrounds the gaze position, subsampling of image data is optionally not performed for the remaining part of the first field of view, and instead sampled image data is collected from the first image sensor for the remaining part of the first field of view. In other words, each of pixels corresponding to the remaining part of the first field of view is read out without performing any subsampling. As a result, the sampled image data enables in achieving a high visual quality (i.e., a native resolution) in corresponding gaze-contingent pixels of the first image. It is to be understood that for the sampled image data, the interpolation is not required to be performed, and thus only the demosaicking is performed.

It will be appreciated that since the remaining part of the first field of view includes and surrounds the gaze position (i.e., the remaining part of the first field of view is a gaze-contingent part of the first field of view), the part of the overlapping field of view pertains to the part of the first field of view that is a peripheral part (i.e., non-gaze-contingent part) of the first field of view. Therefore, in this alternative embodiment, subsampling is performed only in the peripheral part of the first field of view.

Moreover, in an embodiment, the first image data further comprises first additional subsampled image data of a non-overlapping part of the first field of view, wherein a subsampling density employed for the non-overlapping part of the first field of view is higher than a subsampling density employed for the part of the overlapping field of view. In this regard, unlike the (overlapping) part of the first field of view, the non-overlapping part of the first field of view is another part of the first field of view that does not overlap with the second field of view, thus the first additional subsampled image data would only be available from the first image sensor and is to be solely utilised for processing. Therefore, in order to obtain an overall high visual quality (for example, in terms of resolution) across the first image, a higher subsampling density is employed for the non-overlapping part of the first field of view, as compared to a subsampling density employed for the (overlapping) part of the first field of view. Beneficially, in such a case, image data corresponding to unread pixels in the first additional subsampled image data could be highly accurately and reliably generated, by using image data corresponding to (read out) pixels in the first additional subsampled image data only, so as to facilitate in producing an overall high resolution in the first image. Optionally, in this regard, the at least one processor is configured to process the first additional subsampled image data by performing interpolation and demosaicking on the first additional subsampled image data. It will be appreciated that generating the first image in the aforesaid manner takes into account parallax occlusion, wherein the first field of view does not include some portion of the second field of view, and vice versa.

Furthermore, in an embodiment, the at least one processor is configured to:
- generate at least two different subsampling patterns for the first subsampled image data;
- utilise the at least two different subsampling patterns to obtain at least two test samples of the first subsampled image data;
- select at least one subsampling pattern, from amongst the at least two different subsampling patterns, based on a comparison of respective test images generated by processing the at least two test samples with a reference image generated by processing non-subsampled image data; and
- utilise the at least one selected subsampling pattern as the first subsampling pattern for obtaining the first subsampled image data.

In this regard, the at least two different subsampling patterns are subsampling patterns that vary spatially (i.e., having different spatially-varying subsampling densities), and thus the at least two different subsampling patterns would facilitate in performing subsampling differently, as a manner of selectively reading out pixels would be different according to the at least two different subsampling patterns. As an example, two subsampling patterns may be different in terms of a row of pixels or a column of pixels wherefrom the pixels that are to be read out is to be initiated.

Optionally, the first subsampled image data is subsampled according to a given subsampling pattern from amongst the at least two different subsampling patterns, in order to obtain a given test sample. Thus, when the at least two different subsampling patterns are employed for subsampling the first subsampled image data, the at least two (obtained) test samples would comprise different first subsampled image data corresponding to pixels that are read out according to the at least two different subsampling patterns. Optionally, when processing the at least two test samples, the at least one processor is configured to perform interpolation and demosaicking on the at least two test samples, to generate the respective test images. It is to be understood that visual qualities (for example, in term of resolutions) of the respective test images could be different from each other.

When each of the plurality of pixels of the first image sensor is read out, i.e., when the plurality of pixels are sampled, the (fully) non-subsampled image data (namely, sampled image data) is obtained. It will be appreciated that the non-subsampled image data could be considered to be obtained when at least 90 percent of the plurality of pixels of the first image sensor are read out. Thus, the non-subsampled image data is highly comprehensive and information-rich as compared to the at least two test samples of the first subsampled image data, and thus could be understood to be ground-truth image data. Optionally, when processing the non-subsampled image data, the at least one processor is configured to perform demosaicking on the non-subsampled image data, to generate the reference image. In this regard, a set of complete colour values (for example, such as RGB colour values) for each pixel is interpolated for generating the reference image. The term "reference image" refers to an ideal expected image that is generated using the non-subsampled image data. It is to be understood that the reference image has considerably higher resolution and represents more visual details, as compared to the respective test images that would be generated using corresponding test samples.

Optionally, the at least one processor is configured to compare the (generated) test images with the reference image, in a pixel-by-pixel manner. Greater the similarity (for example, in terms of resolution) between a given (generated) test image with the reference image, greater is the probability of selecting a given subsampling pattern corresponding to the given test image, and using the given subsampling pattern as the first subsampling pattern. It will be appreciated that this may potentially facilitate in generating high-resolution and highly accurate first images subsequently. Moreover, the selection of the at least one subsampling pattern based on the aforesaid comparison may also facilitate in determining an accurate reading position of the first image sensor based on the overlapping field of view and a maximum cross view coverage.

It is to be noted that the aforementioned embodiments have been discussed from a perspective of the first image sensor, for the sake of simplicity and better understanding. There will now be briefly discussed similar embodiments from a perspective of the second image sensor.

In an embodiment, the at least one processor is configured to:
obtain information indicative of a gaze direction of a second eye of a user;
identify a gaze position within the second field of view, based on the gaze direction of the second eye; and
vary a subsampling density in the second subsampling pattern, based on an angular distance from the gaze position, wherein the subsampling density decreases on going away from the gaze position.

In an embodiment, the at least one processor is configured to:
obtain information indicative of a gaze direction of a second eye of a user;
identify a gaze position within the second field of view, based on the gaze direction of the second eye;

detect whether the gaze position lies within the overlapping field of view; and
when it is detected that the gaze position lies within the overlapping field of view, select the part of the overlapping field of view based on the gaze position, wherein the part of the overlapping field of view includes and surrounds the gaze position.

In another embodiment, the at least one processor is configured to:
obtain information indicative of a gaze direction of a second eye of a user;
identify a gaze position within the second field of view, based on the gaze direction of the second eye; and
select a remaining part of the second field of view, based on the gaze position, wherein the remaining part of the second field of view includes and surrounds the gaze position.

In an embodiment, the second image data further comprises second additional subsampled image data of a non-overlapping part of the second field of view, wherein a subsampling density employed for the non-overlapping part of the second field of view is higher than a subsampling density employed for the part of the overlapping field of view.

In an embodiment, the at least one processor is configured to:
generate at least two different subsampling patterns for the second subsampled image data;
utilise the at least two different subsampling patterns to obtain at least two test samples of the second subsampled image data;
select at least one subsampling pattern, from amongst the at least two different subsampling patterns, based on a comparison of respective test images generated by processing the at least two test samples with a reference image generated by processing non-subsampled image data; and utilise the at least one selected subsampling pattern as the second subsampling pattern for obtaining the second subsampled image data.

The present disclosure also relates to the method as described above. Various embodiments and variants disclosed above, with respect to the aforementioned imaging system, apply mutatis mutandis to the method. Optionally, in the method, the step of processing the first image data and the second image data to generate the first image and the second image, respectively, is performed using at least one neural network, wherein an input of the at least one neural network comprises the first image data and the second image data. Additionally, optionally, in the method, the input of the at least one neural network further comprises at least one first subsampling mask and at least one second subsampling mask, wherein the at least one first subsampling mask indicates pixels that are missing in the first subsampled image data, and the at least one second subsampling mask indicates pixels that are missing in the second subsampled image data.

Optionally, the method further comprises employing a first path and a second path of the at least one neural network to process the first image data and the second image data, respectively, the first path and the second path being parallel paths. Additionally, optionally, the method further comprises configuring the first path and the second path of the at least one neural network to share at least one of:
(i) the first subsampled image data from the first path to the second path,
(ii) the second subsampled image data from the second path to the first path, (iii) first interpolated image data, generated after performing the interpolation on the first subsampled image data, from the first path to the second path,
(iv) second interpolated image data, generated after performing the interpolation on the second subsampled image data, from the second path to the first path,
(v) the first intermediate image data from the first path to the second path,
(vi) the second intermediate image data from the second path to the first path.

Optionally, the method further comprises:
obtaining information indicative of a gaze direction of a first eye of a user;
identifying a gaze position within the first field of view, based on the gaze direction of the first eye;
detecting whether the gaze position lies within the overlapping field of view; and
when it is detected that the gaze position lies within the overlapping field of view, selecting the part of the overlapping field of view based on the gaze position, wherein the part of the overlapping field of view includes and surrounds the gaze position.

Alternatively, optionally, the method further comprises:
obtaining information indicative of a gaze direction of a first eye of a user;
identifying a gaze position within the first field of view, based on the gaze direction of the first eye; and
selecting a remaining part of the first field of view, based on the gaze position, wherein the remaining part of the first field of view includes and surrounds the gaze position.

Optionally, the method further comprises:
obtaining information indicative of a gaze direction of a first eye of a user;
identifying a gaze position within the first field of view, based on the gaze direction of the first eye; and
varying a subsampling density in the first subsampling pattern, based on an angular distance from the gaze position, wherein the subsampling density decreases on going away from the gaze position.

Optionally, in the method, the first image data further comprises first additional subsampled image data of a non-overlapping part of the first field of view, wherein a subsampling density employed for the non-overlapping part of the first field of view is higher than a subsampling density employed for the part of the overlapping field of view.

Optionally, the method further comprises:
generating at least two different subsampling patterns for the first subsampled image data;
utilising the at least two different subsampling patterns to obtain at least two test samples of the first subsampled image data;
selecting at least one subsampling pattern, from amongst the at least two different subsampling patterns, based on a comparison of respective test images generated by processing the at least two test samples with a reference image generated by processing non-subsampled image data; and utilising the at least one selected subsampling pattern as the first
subsampling pattern for obtaining the first subsampled image data.

Optionally, in the method, the second subsampling pattern is fully or partially complementary to the first subsampling pattern.

DETAILED DESCRIPTION OF THE DRAWINGS

Referring to FIG. 1, illustrated is a block diagram of an architecture of an imaging system 100 incorporating complementing subsampling in stereo cameras, in accordance with an embodiment of the present disclosure. The imaging system 100 comprises a first image sensor 102a, a second image sensor 102b, and at least one processor (depicted as a processor 104). The processor 104 is communicably coupled to the first image sensor 102a and the second image sensor 102b.

It may be understood by a person skilled in the art that FIG. 1 includes a simplified architecture of the imaging system 100, for sake of clarity, which should not unduly limit the scope of the claims herein. It is to be understood that the specific implementation of the imaging system 100 is provided as an example and is not to be construed as limiting it to specific numbers or types of image sensors and/or processors. The person skilled in the art will recognize many variations, alternatives, and modifications of embodiments of the present disclosure.

Figure 2:
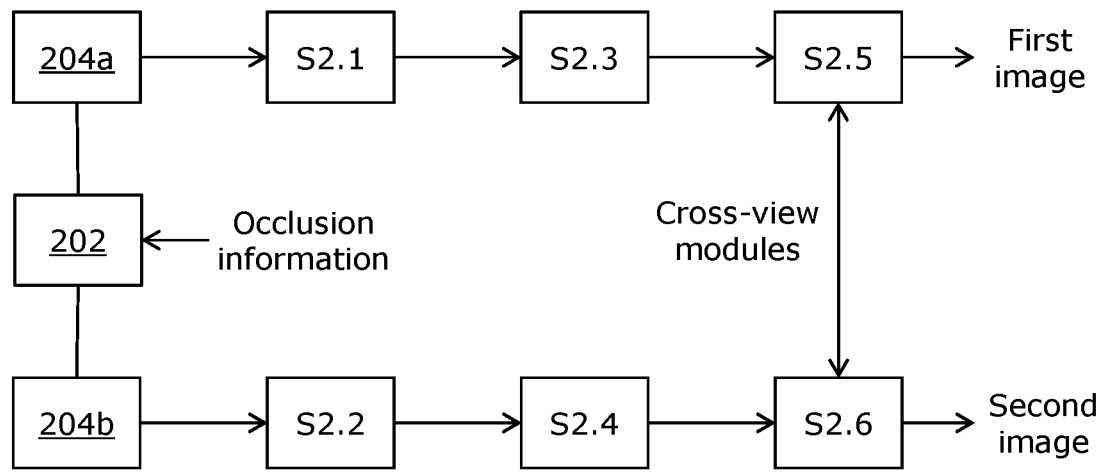
FIG. 2 illustrates an exemplary processing pipeline for generating a first image and a second image, in accordance with an embodiment of the present disclosure.

Referring to FIG. 2, illustrated is an exemplary processing pipeline for generating a first image and a second image, in accordance with an embodiment of the present disclosure. The processing pipeline is implemented by at least one processor (depicted as a processor 202) that is communicably coupled to a first image sensor 204a and a second image sensor 204b forming a stereo pair. At step S2.1, the processor 202 obtains first image data collected by the first image sensor 204a, the first image data comprises first subsampled image data of at least a first part of a first field of view of the first image sensor 204a. Simultaneously, at step S2.2, the processor 202 obtains second image data collected by the second image sensor 204b, the second image data comprises second subsampled image data of at least a second part of a second field of view of the second image sensor 204b. At step S2.3, the processor 202 optionally reprojects the first image data (for example, by using well-known distortion and warping algorithms/techniques) to match a perspective from which the second image data is collected by the second image sensor 204b. Simultaneously, at step S2.4, the processor 202 optionally reprojects the second image data to match a perspective from which the first image data is collected by the first image sensor 204a. At step S2.5, the processor 202 processes the first image data to generate the first image, using a first neural network. Simultaneously, at step S2.6, the processor 202 processes the second image data to generate the second image, using a second neural network. Inputs of both the first neural network and the second neural network comprise the first image data and the second image data. In this regard, the first neural network is utilised for performing interpolation and demosaicking on the first subsampled image data, by utilising the second subsampled image data, to generate first intermediate image data. Then, the first intermediate image data is processed to generate the first image. Similarly, the second neural network is utilised for performing interpolation and demosaicking on the second subsampled image data, by utilising the first subsampled image data, to generate second intermediate image data. Then, the second intermediate image data is processed to generate the second image. It will be appreciated that the first neural network and the second neural network have a first path and a second path that are employed to process the first image data and the second image data, respectively, the first path and the second path being parallel paths. The first path and the second path are configured to share different image data (for example, the first subsampled image data and/or the first intermediate image data) from the first path to the second path and/or share different image data (for example, the second subsampled image data and/or the second intermediate image data) from the second path to the first path. This could, for example, be implemented by employing attention modules (namely, cross-view modules) in the first path and the second path.

Referring to FIGS. 3A, 3B, 3C, and 3D illustrate an exemplary way of performing interpolation on subsampled image data of a part of a field of view of an image sensor, in accordance with an embodiment of the present disclosure. As shown, the part of the field of view of the image sensor corresponds to a portion 300 of a photo-sensitive surface of the image sensor. The portion 300 is shown to comprise 64 pixels arranged in an 8×8 array, for the sake of simplicity and clarity. In FIGS. 3A-3D, said interpolation is performed to generate image data corresponding to remaining pixels in the portion 300.

Figure 3A:
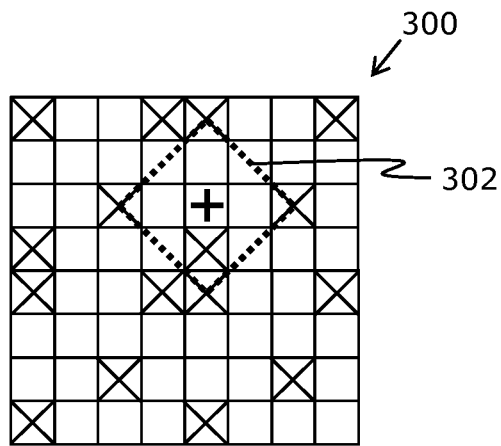
FIGS. 3A, 3B, 3C, and 3D illustrate an exemplary way of performing interpolation on subsampled image data of a part of a field of view of an image sensor, in accordance with an embodiment of the present disclosure.
Figure 3B:
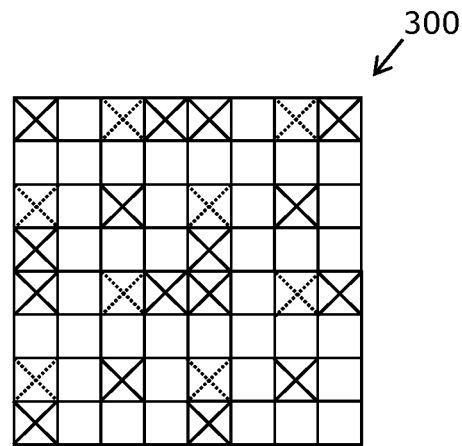

In FIG. 3A, pixels that are read out from the portion 300 are shown as 16 pixels that are crossed out as solid 'X's. A diamond pattern 302 is employed for generating image data, wherein image data corresponding to pixels at corners of the diamond pattern 302 is used to generate image data corresponding to a pixel (labelled as '+') lying in a centre of the diamond pattern 302. The diamond pattern 302 is moved across the portion 300, to generate image data corresponding to at least one pixel in the portion 300. In FIG. 3B, there are shown 8 pixels (crossed out as dotted 'X's) for which image data is generated using the diamond pattern 302.

Figure 3C:
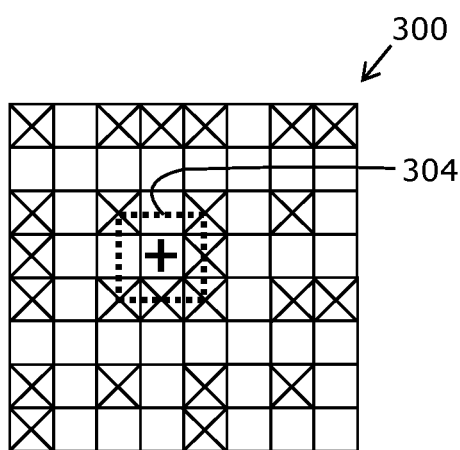
Figure 3D:
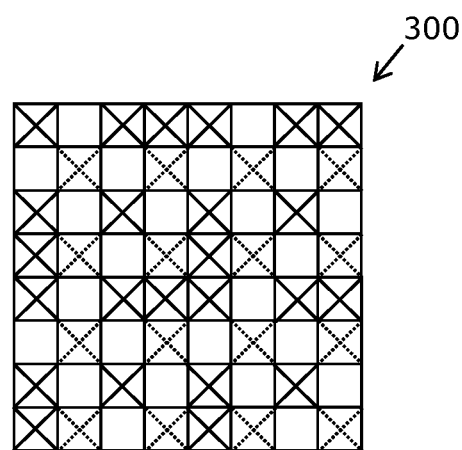

Next, in FIG. 3C, pixels for which image data is now available, are shown as 24 pixels that are crossed out as solid 'X's. A square pattern 304 is employed for generating image data, wherein image data corresponding to pixels at corners of the square pattern 304 is used to generate image data corresponding to a pixel (labelled as '+') lying in a centre of the square pattern 304. The square pattern 304 is moved across the portion 300, to generate image data corresponding to at least one pixel in the portion 300. In FIG. 3D, there are shown 16 pixels (crossed out as dotted 'X's) for which image data is generated using the square pattern 304. It will be appreciated that apart from using the diamond pattern 302 and the square pattern 304 as described hereinabove, when a remaining pixel (of the portion 300) lies diagonally in between two pixels that are read out from the portion 300, image data corresponding to said remaining pixel could be generated by averaging image data corresponding to the aforesaid two pixels, or by performing interpolation on the image data corresponding to the aforesaid two pixels.

FIGS. 4A, 4D, 5A, 6A, 7A and 7D depict six different examples of a first subsampling pattern employed for sub-sampling image data of at least a first part of a first field of view of a first image sensor, while FIGS. 4B, 4E, 5B, 6B, 7B and 7E depict respective ones of six different examples of a second subsampling pattern employed for subsampling image data of at least a second part of a second field of view of a second image sensor, in accordance with embodiments of the present disclosure. For sake of clarity and simplicity, only a portion of a given subsampling pattern corresponding to an 8×8 array of pixels arranged on a portion of a photo-sensitive surface of a given image sensor is depicted in the aforementioned figures. Moreover, pixels that are read out according to a given subsampling pattern are crossed out as solid 'X's. The term "given subsampling pattern" encompasses the first subsampling pattern and/or the second subsampling pattern. The term "given image sensor" encompasses the first image sensor and/or the second image sensor.

Figure 4A:
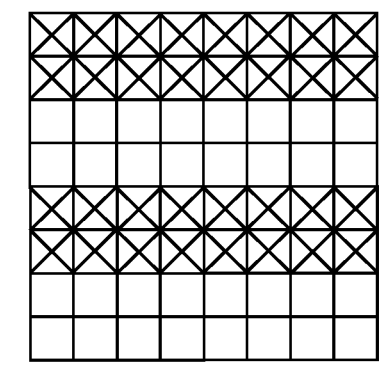
Figure 4B:
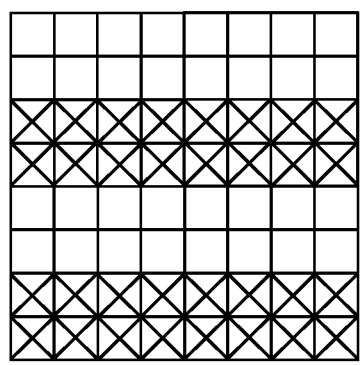
Figure 4C:
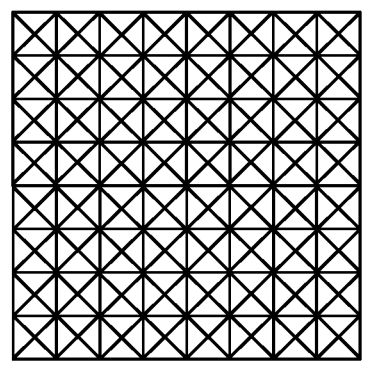

Referring now to FIGS. 4A-C, FIGS. 4A and 4B illustrate a first subsampling pattern 402a and a second subsampling pattern 404a, respectively, while FIG. 4C illustrates an overall subsampling pattern obtained by combining the first subsampling pattern 402a and the second subsampling pattern 404a, in accordance with an embodiment of the present disclosure. Likewise, referring to FIGS. 4D-F, FIGS. 4D and 4E illustrate a first subsampling pattern 402b and a second subsampling pattern 404b, respectively, while FIG. 4F illustrates an overall subsampling pattern obtained by combining the first subsampling pattern 402b and the second subsampling pattern 404b, in accordance with an embodiment of the present disclosure.

The first subsampling pattern 402a and the second subsampling pattern 404a do not overlap with each other at all; likewise, the first subsampling pattern 402b and the second subsampling pattern 404b do not overlap with each other at all. In other words, the second subsampling patterns 404a and 404b are fully complimentary to the first subsampling patterns 402a and 402b, respectively. As shown, out of 64 pixels, 32 distinct pixels are read out according to the first subsampling patterns 402a and 402b, and remaining 32 distinct pixels are read out according to the second subsampling patterns 404a and 404b, respectively. With reference to FIGS. 4C and 4F, the overall subsampling pattern covers an entirety of a part of an overlapping field of view between the first image sensor and the second image sensor, wherein the first part of the first field of view and the second part of the second field of view comprise said part of the overlapping field of view. In other words, full image data is read out for the part of the overlapping field of view from both the first image sensor and the second image sensor in a combined manner.

Referring to FIGS. 5A, 5B, and 5C, FIG. 5A illustrates a first subsampling pattern 502, FIG. 5B illustrates a second subsampling pattern 504, while FIG. 5C illustrates an overall subsampling pattern obtained by combining the first subsampling pattern 502 and the second subsampling pattern 504, in accordance with another embodiment of the present disclosure. With reference to FIGS. 5A and 5B, the first subsampling pattern 502 and the second subsampling pattern 504 partially overlap with each other. In other words, the second subsampling pattern 504 is partially complimentary to the first subsampling pattern 502. This means there are some common pixels that are read out according to the first subsampling pattern 502 as well as the second subsampling pattern 504. As shown, out of 64 pixels, 32 pixels are read out according to the first subsampling pattern 502 and 48 pixels are read out according to the second subsampling pattern 504. Out of these 48 pixels, 16 pixels are the common pixels. With reference to FIG. 5C, the overall subsampling pattern covers an entirety of a part of an overlapping field of view between the first image sensor and the second image sensor. In other words, full image data is read out for the part of the overlapping field of view from both the first image sensor and the second image sensor in a combined manner.

Referring to FIGS. 6A, 6B, and 6C, FIG. 6A illustrates a first subsampling pattern 602, FIG. 6B illustrates a second subsampling pattern 604, while FIG. 6C illustrates an overall subsampling pattern obtained by combining the first subsampling pattern 602 and the second subsampling pattern 604, in accordance with yet another embodiment of the present disclosure. With reference to FIGS. 6A and 6B, the first subsampling pattern 602 and the second subsampling pattern 604 partially overlap with each other. In other words, the second subsampling pattern 604 is partially complimentary to the first subsampling pattern 602. This means there are some common pixels that are read out according to the first subsampling pattern 602 as well as the second subsampling pattern 604. As shown, out of 64 pixels, 32 pixels are read out according to the first subsampling pattern 602 and 32 pixels are read out according to the second subsampling pattern 604. Out of the 32 pixels read out according to the second subsampling pattern 604, 8 pixels are the common pixels.

With reference to FIG. 6C, the overall subsampling pattern do not cover an entirety of a part of an overlapping field of view between the first image sensor and the second image sensor. In other words, some image data is not read out for the part of the overlapping field of view from any of the first image sensor and the second image sensor. As shown in FIG. 6C, there are 16 pixels that are not read out according to any of the first subsampling pattern 602 and the second subsampling pattern 604.

Figure 7A:
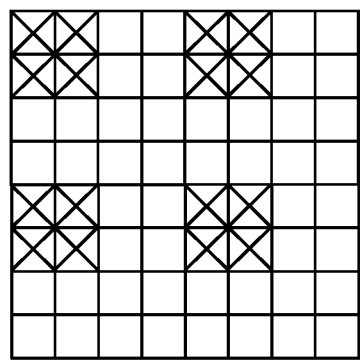
Figure 7B:
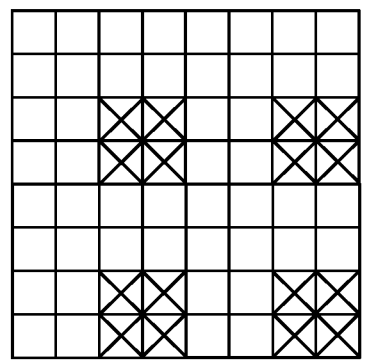
Figure 7C:
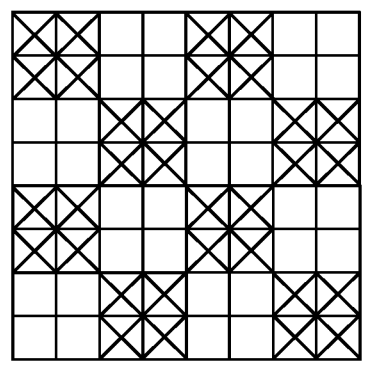

Referring now to FIGS. 7A-C, FIGS. 7A and 7B illustrate a first subsampling pattern 702a and a second subsampling pattern 704a, respectively, while FIG. 7C illustrates an overall subsampling pattern obtained by combining the first subsampling pattern 702a and the second subsampling pattern 704a, in accordance with an embodiment of the present disclosure. Likewise, referring to FIGS. 7D-F, FIGS. 7D and 7E illustrate a first subsampling pattern 702b and a second subsampling pattern 704b, respectively, while FIG. 7F illustrates an overall subsampling pattern obtained by combining the first subsampling pattern 702b and the second subsampling pattern 704b, in accordance with an embodiment of the present disclosure.

The first subsampling pattern 702a and the second subsampling pattern 704a do not overlap with each other at all; likewise, the first subsampling pattern 702b and the second subsampling pattern 704b do not overlap with each other at all. In other words, the second subsampling patterns 704a and 704b are partially complimentary to the first subsampling patterns 702a and 702b, respectively. As shown in FIGS. 7A and 7B, out of 64 pixels, 16 distinct pixels are read out according to the first subsampling pattern 702a and 16 distinct pixels are read out according to the second subsampling pattern 704a. As shown in FIGS. 7D and 7E, out of 64 pixels, 32 distinct pixels are read out according to the first subsampling pattern 702b and 16 distinct pixels are read out according to the second subsampling pattern 704b.

With reference to FIGS. 7C and 7F, the overall subsampling pattern do not cover an entirety of a part of an overlapping field of view between the first image sensor and the second image sensor. In other words, some image data is not read out for the part of the overlapping field of view from any of the first image sensor and the second image sensor. As shown in FIG. 7C, there are 32 pixels that are not read out according to any of the first subsampling pattern 702a and the second subsampling pattern 704a. As shown in FIG. 7F, there are 16 pixels that are not read out according to any of the first subsampling pattern 702b and the second subsampling pattern 704b.

FIGS. 2, 3A-3D, 4A-4F, 5A-5C, 6A-6C, 7A-7F are merely examples, which should not unduly limit the scope of the claims herein. The person skilled in the art will recognize many variations, alternatives, and modifications of embodiments of the present disclosure.

Figures 8A, 8B, 9A, 9B:
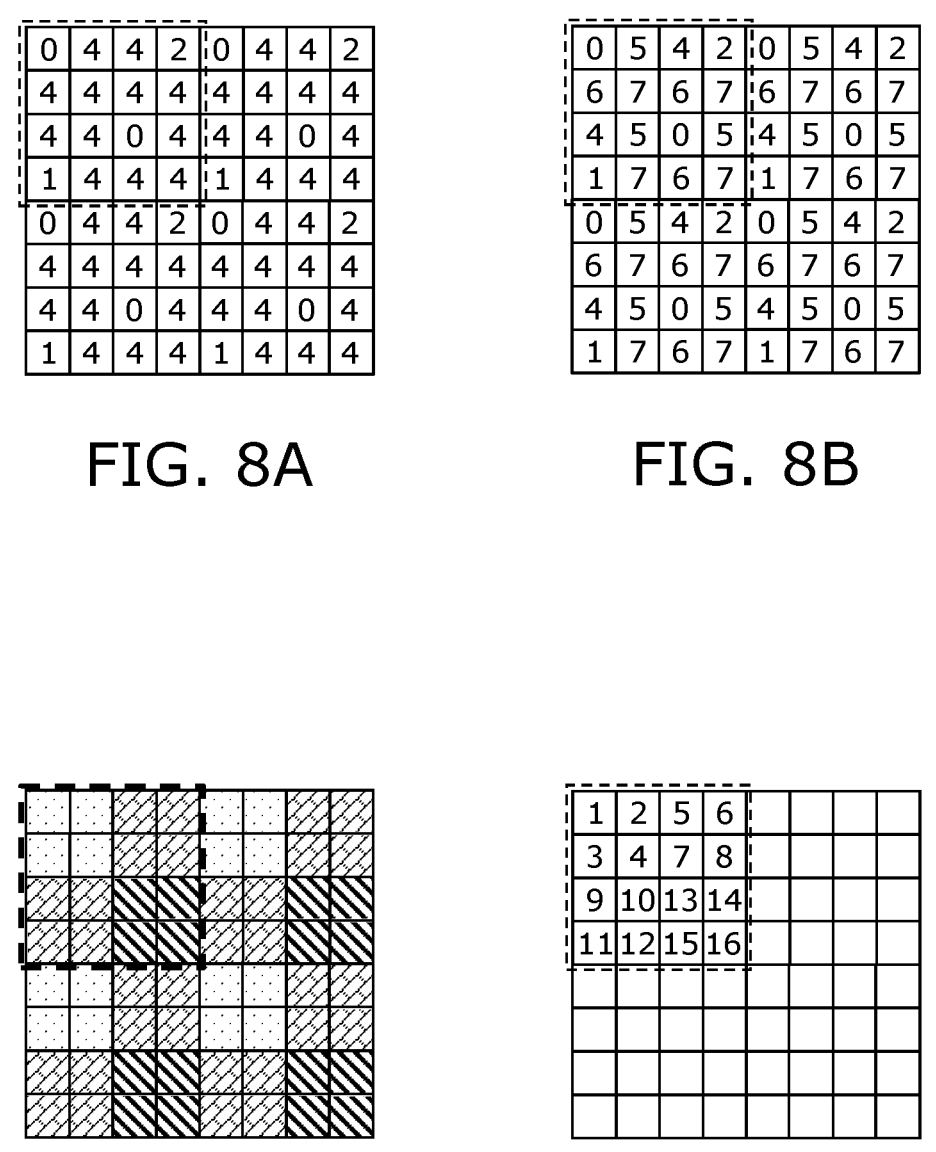

Referring to FIGS. 8A and 8B, illustrated are exemplary ways in which a given subsampling mask indicates colours of pixels using spatial pixel codes, in accordance with an embodiment of the present disclosure. With reference to FIGS. 8A and 8B, the given subsampling mask is shown as an 8×8 subsampling masking pattern, for the sake of simplicity and clarity. Moreover, a portion (depicted using a dashed box) of the given subsampling mask corresponds to a 4×4 array of pixels arranged on a portion of a photo-sensitive surface of an image sensor, and is optionally repeated in the given subsampling mask, for the sake of simplicity. With reference to FIG. 8A, the portion of the given subsampling mask indicates 4 pixels that have been read out from amongst 16 pixels, and also indicates colours of such 4 pixels, using different spatial pixel codes, for example, such as '0' indicating a green colour pixel, '1' indicating a blue colour pixel, and '2' indicating a red colour pixel. In addition to this, said portion of the given subsampling mask also indicates 12 pixels amongst the 16 pixels that have not been read out (namely, the pixels that are skipped during the read out), using a single spatial pixel code, for example, such as '4'. Such a single spatial pixel code only indicates that the 12 pixels have not been read out and thus, does not indicate colours of such 12 pixels.

With reference to FIG. 8B, the portion of the given subsampling mask indicates 4 pixels amongst 16 pixels that have been read out and also indicates colours of such 4 (read) pixels, using different spatial pixel codes, for example, such as '0' indicating a green colour pixel, '1' indicating a blue colour pixel, '2' indicating a red colour pixel, and '3' indicating another green colour pixel. In addition to this, said portion of the subsampling mask also indicates 12 pixels amongst the 16 pixels that have not been read out and also indicates colours of such 12 (unread) pixels, using different spatial pixel codes, for example, such as '4' indicating an unread green colour pixel, '5' indicating an unread red colour pixel, '6' indicating an unread blue colour pixel, and '7' indicating another unread green colour pixel.

FIGS. 8A and 8B are merely examples, which should not unduly limit the scope of the claims herein. The person skilled in the art will recognize many variations, alternatives, and modifications of embodiments of the present disclosure. As an example, with reference to FIG. 8A, the single spatial pixel code could also be different than that mentioned earlier. For example, the single spatial pixel code may be 3, 5, −1, −2, −3, or similar. As another example, with reference to FIG. 8B, the colours of the 4 pixels could also be indicated by using spatial pixel codes other than those mentioned earlier. For example, spatial pixel codes of the 4 unread pixels may be '−1', '−2', '−3', and '−4' for indicating the unread green colour pixel, the unread blue colour pixel, the unread red colour pixel, and the another unread green colour pixel, respectively. Similarly, the colours of the 12 pixels could also be indicated by using spatial pixel codes other than those mentioned earlier.

Referring to FIGS. 9A and 9B, FIG. 9A illustrates an exemplary colour filter array (CFA) pattern of a given image sensor indicated by a given subsampling mask, while FIG. 9B illustrates an exemplary way in which a portion of the given subsampling mask indicates colours in a smallest repeating 4×4 array in the given image sensor using different spatial pixel codes, in accordance with an embodiment of the present disclosure. With reference to FIG. 9A, a portion (depicted using a dashed box) of the CFA pattern corresponds to a 4×4 array of pixels arranged on a portion of a photo-sensitive surface of the given image sensor, and is repeated in the CFA pattern. The CFA pattern is shown as a quad Bayer pattern, wherein the quad Bayer pattern has, one 2×2 array of blue colour pixels (depicted as a dotted pattern), two 2×2 arrays of green colour pixels (depicted as a diagonal brick pattern), and one 2×2 array of red colour pixels (depicted as a diagonal line pattern).

With reference to FIG. 9B, the portion of the given subsampling mask indicates 4 blue colour pixels using 4 different spatial pixel codes '1', '2', '3', and '4', respectively. Similarly, the portion indicates 8 green colour pixels using 8 different spatial pixel codes '5', '6', '7', '8', '9', '10', '11', and '12', respectively. The portion indicates 4 red colour pixels using 4 different spatial pixel codes as '13', '14', '15' and '16', respectively.

FIGS. 9A and 9B are merely examples, which should not unduly limit the scope of the claims herein. The person skilled in the art will recognize many variations, alternatives, and modifications of embodiments of the present disclosure. As an example, with reference to FIG. 9B, when two green colour pixels having spatial pixel codes '9' and '10' or having spatial pixel codes '9' and '12' are to be read out together, this can be indicated in the subsampling mask by using a single spatial pixel code '17'. Similarly, when three red colour pixels having spatial pixel codes '13', '14', and '16' are to be read out together, this can be indicated in the subsampling mask by using a single spatial pixel code '18'. When all the four red colour pixels having spatial pixel codes '13', '14', '15', and '16' are to be read out together, this can be indicated in the subsampling mask by using a single spatial pixel code '19'.

Figure 10:
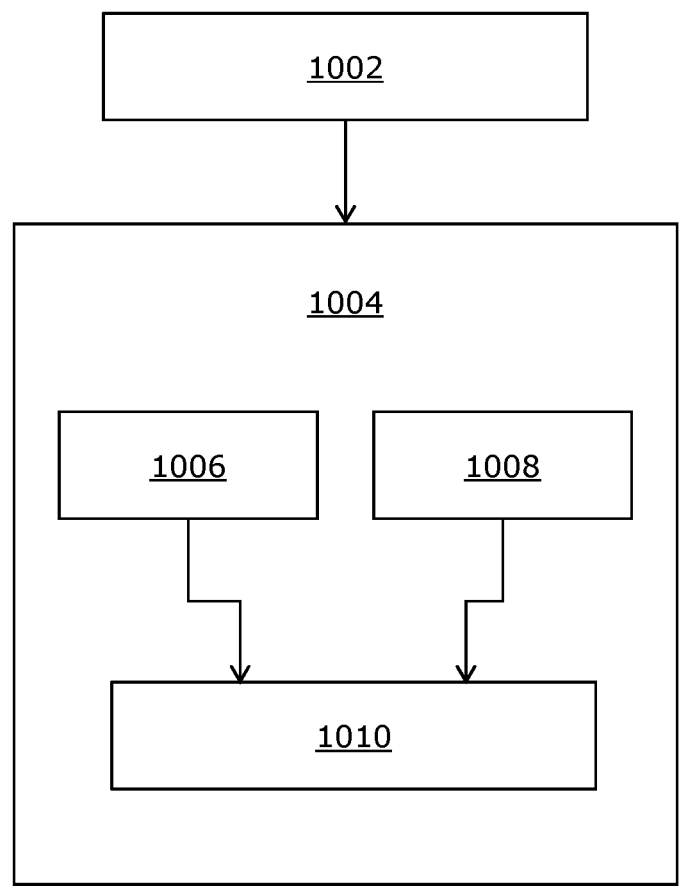
FIG. 10 illustrates steps of a method incorporating complementing subsampling in stereo cameras, in accordance with an embodiment of the present disclosure.

Referring to FIG. 10, illustrated are steps of a method incorporating complementing subsampling in stereo cameras, in accordance with an embodiment of the present disclosure. At step 1002, first image data and second image data are obtained, the first image data and the second image data being collected by a first image sensor and a second image sensor, respectively, wherein the first image sensor and the second image sensor form a stereo pair, and wherein: the first image data comprises first subsampled image data of at least a first part of a first field of view of the first image sensor, the first subsampled image data being subsampled according to a first subsampling pattern, the second image data comprises second subsampled image data of at least a second part of a second field of view of the second image sensor, the second subsampled image data being subsampled according to a second subsampling pattern that is different from the first subsampling pattern, the first part of the first field of view and the second part of the second field of view comprise at least a part of an overlapping field of view between the first image sensor and the second image sensor. At step 1004, the first image data and the second image data are processed to generate a first image and a second image, respectively. Step 1004 comprises steps 1006, 1008 and 1010. In this regard, at step 1006, interpolation and demosaicking are performed on the first subsampled image data, by utilising the second subsampled image data, to generate first intermediate image data. Simultaneously, at step 1008, interpolation and demosaicking are performed on the second subsampled image data, by utilising the first subsampled image data, to generate second intermediate image data. At step 1010, the first intermediate image data is processed to generate the first image, and the second intermediate image data is processed to generate the second image.

The aforementioned steps are only illustrative and other alternatives can also be provided where one or more steps are added, one or more steps are removed, or one or more steps are provided in a different sequence without departing from the scope of the claims.

What is claimed is:

1. An imaging system comprising:
a first image sensor and a second image sensor, forming a stereo pair; and
at least one processor configured to:
obtain first image data and second image data collected by the first image sensor and the second image sensor, respectively, wherein:
the first image data comprises first subsampled image data of at least a first part of a first field of view of the first image sensor, the first subsampled image data being subsampled according to a first subsampling pattern,
the second image data comprises second subsampled image data of at least a second part of a second field of view of the second image sensor, the second subsampled image data being subsampled according to a second subsampling pattern that is different from the first subsampling pattern,
the first part of the first field of view and the second part of the second field of view comprise at least a part of an overlapping field of view between the first image sensor and the second image sensor; and
process the first image data and the second image data to generate a first image and a second image, respectively, wherein, when processing, the at least one processor is configured to:
perform interpolation and demosaicking on the first subsampled image data, by utilising the second subsampled image data, to generate first intermediate image data;
perform interpolation and demosaicking on the second subsampled image data, by utilising the first subsampled image data, to generate second intermediate image data; and
process the first intermediate image data to generate the first image, and process the second intermediate image data to generate the second image;
obtain information indicative of a gaze direction of a first eye of a user;
identify a gaze position within the first field of view, based on the gaze direction of the first eye;
detect whether the gaze position lies within the overlapping field of view; and
when it is detected that the gaze position lies within the overlapping field of view, select the part of the overlapping field of view based on the gaze position, wherein the part of the overlapping field of view includes and surrounds the gaze position.

2. The imaging system of claim 1, wherein the at least one processor is configured to process the first image data and the second image data to generate the first image and the second image, respectively, using at least one neural network, wherein an input of the at least one neural network comprises the first image data and the second image data.

3. The imaging system of claim 2, wherein the at least one neural network has a first path and a second path that are employed to process the first image data and the second image data, respectively, the first path and the second path being parallel paths.

4. The imaging system of claim 3, wherein the first path and the second path of the at least one neural network are configured to share at least one of:
(i) the first subsampled image data from the first path to the second path,
(ii) the second subsampled image data from the second path to the first path,
(iii) first interpolated image data, generated after performing the interpolation on the first subsampled image data, from the first path to the second path,
(iv) second interpolated image data, generated after performing the interpolation on the second subsampled image data, from the second path to the first path,
(v) the first intermediate image data from the first path to the second path, (vi) the second intermediate image data from the second path to the first path.

5. The imaging system of claim 2, wherein the input of the at least one neural network further comprises at least one first subsampling mask and at least one second subsampling mask, wherein the at least one first subsampling mask indicates pixels that are missing in the first subsampled image data, and the at least one second subsampling mask indicates pixels that are missing in the second subsampled image data.

6. The imaging system of claim 1, wherein the second subsampling pattern is fully or partially complementary to the first subsampling pattern.

7. An imaging system comprising:
a first image sensor and a second image sensor, forming a stereo pair; and
at least one processor configured to:
obtain first image data and second image data collected by the first image sensor and the second image sensor, respectively, wherein:
the first image data comprises first subsampled image data of at least a first part of a first field of view of the first image sensor, the first subsampled image data being subsampled according to a first subsampling pattern,
the second image data comprises second subsampled image data of at least a second part of a second field of view of the second image sensor, the second subsampled image data being subsampled according to a second subsampling pattern that is different from the first subsampling pattern,
the first part of the first field of view and the second part of the second field of view comprise at least a part of an overlapping field of view between the first image sensor and the second image sensor; and
process the first image data and the second image data to generate a first image and a second image, respectively, wherein, when processing, the at least one processor is configured to:
perform interpolation and demosaicking on the first subsampled image data, by utilising the second subsampled image data, to generate first intermediate image data;
perform interpolation and demosaicking on the second subsampled image data, by utilising the first subsampled image data, to generate second intermediate image data; and
process the first intermediate image data to generate the first image, and process the second intermediate image data to generate the second image;
obtain information indicative of a gaze direction of a first eye of a user;
identify a gaze position within the first field of view, based on the gaze direction of the first eye; and
select a remaining part of the first field of view, based on the gaze position, wherein the remaining part of the first field of view includes and surrounds the gaze position.

8. An imaging system comprising:
a first image sensor and a second image sensor, forming a stereo pair; and
at least one processor configured to:
obtain first image data and second image data collected by the first image sensor and the second image sensor, respectively, wherein:
the first image data comprises first subsampled image data of at least a first part of a first field of view of the first image sensor, the first subsampled image data being subsampled according to a first subsampling pattern,
the second image data comprises second subsampled image data of at least a second part of a second field of view of the second image sensor, the second subsampled image data being subsampled according to a second subsampling pattern that is different from the first subsampling pattern,
the first part of the first field of view and the second part of the second field of view comprise at least a part of an overlapping field of view between the first image sensor and the second image sensor; and
process the first image data and the second image data to generate a first image and a second image, respectively, wherein, when processing, the at least one processor is configured to:
perform interpolation and demosaicking on the first subsampled image data, by utilising the second subsampled image data, to generate first intermediate image data;
perform interpolation and demosaicking on the second subsampled image data, by utilising the first subsampled image data, to generate second intermediate image data; and
process the first intermediate image data to generate the first image, and process the second intermediate image data to generate the second image;
obtain information indicative of a gaze direction of a first eye of a user;
identify a gaze position within the first field of view, based on the gaze direction of the first eye; and
vary a subsampling density in the first subsampling pattern, based on an angular distance from the gaze position, wherein the subsampling density decreases on going away from the gaze position.

9. An imaging system comprising:
a first image sensor and a second image sensor, forming a stereo pair; and
at least one processor configured to:
obtain first image data and second image data collected by the first image sensor and the second image sensor, respectively, wherein:
the first image data comprises first subsampled image data of at least a first part of a first field of view of the first image sensor, the first subsampled image data being subsampled according to a first subsampling pattern,
the second image data comprises second subsampled image data of at least a second part of a second field of view of the second image sensor, the second subsampled image data being subsampled according to a second subsampling pattern that is different from the first subsampling pattern,
the first part of the first field of view and the second part of the second field of view comprise at least a part of an overlapping field of view between the first image sensor and the second image sensor; and
process the first image data and the second image data to generate a first image and a second image, respectively, wherein, when processing, the at least one processor is configured to:

perform interpolation and demosaicking on the first subsampled image data, by utilising the second subsampled image data, to generate first intermediate image data;

perform interpolation and demosaicking on the second subsampled image data, by utilising the first subsampled image data, to generate second intermediate image data; and process the first intermediate image data to generate the first image, and process the second intermediate image data to generate the second image;

wherein the first image data further comprises first additional subsampled image data of a non-overlapping part of the first field of view, wherein a subsampling density employed for the non-overlapping part of the first field of view is higher than a subsampling density employed for the part of the overlapping field of view.

10. An imaging system comprising:
a first image sensor and a second image sensor, forming a stereo pair; and
at least one processor configured to:
obtain first image data and second image data collected by the first image sensor and the second image sensor, respectively, wherein:
the first image data comprises first subsampled image data of at least a first part of a first field of view of the first image sensor, the first subsampled image data being subsampled according to a first subsampling pattern,
the second image data comprises second subsampled image data of at least a second part of a second field of view of the second image sensor, the second subsampled image data being subsampled according to a second subsampling pattern that is different from the first subsampling pattern,
the first part of the first field of view and the second part of the second field of view comprise at least a part of an overlapping field of view between the first image sensor and the second image sensor; and
process the first image data and the second image data to generate a first image and a second image, respectively, wherein, when processing, the at least one processor is configured to:
perform interpolation and demosaicking on the first subsampled image data, by utilising the second subsampled image data, to generate first intermediate image data;
perform interpolation and demosaicking on the second subsampled image data, by utilising the first subsampled image data, to generate second intermediate image data; and
process the first intermediate image data to generate the first image, and process the second intermediate image data to generate the second image;
generate at least two different subsampling patterns for the first subsampled image data;
utilise the at least two different subsampling patterns to obtain at least two test samples of the first subsampled image data;
select at least one subsampling pattern, from amongst the at least two different subsampling patterns, based on a comparison of respective test images generated by processing the at least two test samples with a reference image generated by processing non-subsampled image data; and utilise the at least one selected subsampling pattern as the first subsampling pattern for obtaining the first subsampled image data.

11. A method comprising:
obtaining first image data and second image data collected by a first image sensor and a second image sensor, respectively, wherein the first image sensor and the second image sensor form a stereo pair, and wherein:
the first image data comprises first subsampled image data of at least a first part of a first field of view of the first image sensor, the first subsampled image data being subsampled according to a first subsampling pattern,
the second image data comprises second subsampled image data of at least a second part of a second field of view of the second image sensor, the second subsampled image data being subsampled according to a second subsampling pattern that is different from the first subsampling pattern,
the first part of the first field of view and the second part of the second field of view comprise at least a part of an overlapping field of view between the first image sensor and the second image sensor; and
processing the first image data and the second image data to generate a first image and a second image, respectively, wherein the step of processing comprises:
performing interpolation and demosaicking on the first subsampled image data, by utilising the second subsampled image data, to generate first intermediate image data;
performing interpolation and demosaicking on the second subsampled image data, by utilising the first subsampled image data, to generate second intermediate image data; and
processing the first intermediate image data to generate the first image, and processing the second intermediate image data to generate the second image,
obtaining information indicative of a gaze direction of a first eye of a user;
identifying a gaze position within the first field of view, based on the gaze direction of the first eye;
detecting whether the gaze position lies within the overlapping field of view; and
when it is detected that the gaze position lies within the overlapping field of view, selecting the part of the overlapping field of view based on the gaze position, wherein the part of the overlapping field of view includes and surrounds the gaze position.

12. The method of claim 11, wherein the step of processing the first image data and the second image data to generate the first image and the second image, respectively, is performed using at least one neural network, wherein an input of the at least one neural network comprises the first image data and the second image data.

13. The method of claim 12, further comprising employing a first path and a second path of the at least one neural network to process the first image data and the second image data, respectively, the first path and the second path being parallel paths.

14. The method of claim 12, wherein the input of the at least one neural network further comprises at least one first subsampling mask and at least one second subsampling mask, wherein the at least one first subsampling mask indicates pixels that are missing in the first subsampled image data, and the at least one second subsampling mask indicates pixels that are missing in the second subsampled image data.

15. The method of claim 12, wherein the method further comprises configuring the first path and the second path of the at least one neural network to share at least one of:
  (i) the first subsampled image data from the first path to the second path,
  (ii) the second subsampled image data from the second path to the first path,
  (iii) first interpolated image data, generated after performing the interpolation on the first subsampled image data, from the first path to the second path,
  (iv) second interpolated image data, generated after performing the interpolation on the second subsampled image data, from the second path to the first path,
  (v) the first intermediate image data from the first path to the second path,
  (vi) the second intermediate image data from the second path to the first path.

16. A method comprising:
  obtaining first image data and second image data collected by a first image sensor and a second image sensor, respectively, wherein the first image sensor and the second image sensor form a stereo pair, and wherein:
    the first image data comprises first subsampled image data of at least a first part of a first field of view of the first image sensor, the first subsampled image data being subsampled according to a first subsampling pattern,
    the second image data comprises second subsampled image data of at least a second part of a second field of view of the second image sensor, the second subsampled image data being subsampled according to a second subsampling pattern that is different from the first subsampling pattern,
    the first part of the first field of view and the second part of the second field of view comprise at least a part of an overlapping field of view between the first image sensor and the second image sensor; and
  processing the first image data and the second image data to generate a first image and a second image, respectively, wherein the step of processing comprises:
    performing interpolation and demosaicking on the first subsampled image data, by utilising the second subsampled image data, to generate first intermediate image data;
    performing interpolation and demosaicking on the second subsampled image data, by utilising the first subsampled image data, to generate second intermediate image data; and
    processing the first intermediate image data to generate the first image, and processing the second intermediate image data to generate the second image,
  obtaining information indicative of a gaze direction of a first eye of a user;
  identifying a gaze position within the first field of view, based on the gaze direction of the first eye; and
  selecting a remaining part of the first field of view, based on the gaze position, wherein the remaining part of the first field of view includes and surrounds the gaze position.

17. A method comprising:
  obtaining first image data and second image data collected by a first image sensor and a second image sensor, respectively, wherein the first image sensor and the second image sensor form a stereo pair, and wherein:
    the first image data comprises first subsampled image data of at least a first part of a first field of view of the first image sensor, the first subsampled image data being subsampled according to a first subsampling pattern,
    the second image data comprises second subsampled image data of at least a second part of a second field of view of the second image sensor, the second subsampled image data being subsampled according to a second subsampling pattern that is different from the first subsampling pattern,
    the first part of the first field of view and the second part of the second field of view comprise at least a part of an overlapping field of view between the first image sensor and the second image sensor; and
  processing the first image data and the second image data to generate a first image and a second image, respectively, wherein the step of processing comprises:
    performing interpolation and demosaicking on the first subsampled image data, by utilising the second subsampled image data, to generate first intermediate image data;
    performing interpolation and demosaicking on the second subsampled image data, by utilising the first subsampled image data, to generate second intermediate image data; and
    processing the first intermediate image data to generate the first image, and processing the second intermediate image data to generate the second image,
  obtaining information indicative of a gaze direction of a first eye of a user;
  identifying a gaze position within the first field of view, based on the gaze direction of the first eye; and
  varying a subsampling density in the first subsampling pattern, based on an angular distance from the gaze position, wherein the subsampling density decreases on going away from the gaze position.

18. A method comprising:
  obtaining first image data and second image data collected by a first image sensor and a second image sensor, respectively, wherein the first image sensor and the second image sensor form a stereo pair, and wherein:
    the first image data comprises first subsampled image data of at least a first part of a first field of view of the first image sensor, the first subsampled image data being subsampled according to a first subsampling pattern,
    the second image data comprises second subsampled image data of at least a second part of a second field of view of the second image sensor, the second subsampled image data being subsampled according to a second subsampling pattern that is different from the first subsampling pattern,
    the first part of the first field of view and the second part of the second field of view comprise at least a part of an overlapping field of view between the first image sensor and the second image sensor; and
  processing the first image data and the second image data to generate a first image and a second image, respectively, wherein the step of processing comprises:
    performing interpolation and demosaicking on the first subsampled image data, by utilising the second subsampled image data, to generate first intermediate image data;
    performing interpolation and demosaicking on the second subsampled image data, by utilising the first subsampled image data, to generate second intermediate image data; and processing the first intermediate image data to generate the first image, and processing the second intermediate image data to generate the second image, generating at least two different subsampling patterns for the first subsampled image data;

utilising the at least two different subsampling patterns to obtain at least two test samples of the first subsampled image data;

selecting at least one subsampling pattern, from amongst the at least two different subsampling patterns, based on a comparison of respective test images generated by processing the at least two test samples with a reference image generated by processing non-subsampled image data; and utilising the at least one selected subsampling pattern as the first subsampling pattern for obtaining the first subsampled image data.

* * * * *